United States Patent
Manas et al.

(10) Patent No.: US 11,616,742 B2
(45) Date of Patent: Mar. 28, 2023

(54) METHODS AND SYSTEMS FOR END-TO-END ENCRYPTED MESSAGE HISTORY EXCHANGE

(71) Applicant: WhatsApp LLC, Menlo Park, CA (US)

(72) Inventors: Alfonso Gomez Jordana Manas, Palo Alto, CA (US); Bruno Rafael Penteado Muratore, Wembley (GB); Cheng Tian, San Ramon, CA (US); Daniel Lozano Valdes, Redwood City, CA (US); Maksym Koshtenko, Kingston Upon Thames (GB); Oleg Sukhodolskii, Gibsonia, PA (US); Robert Mason, San Francisco, CA (US); Theodore Elliot Yaung, London (GB)

(73) Assignee: WhatsApp LLC, Menlo Park, CA (US)

( * ) Notice: Subject to any disclaimer, the term of this patent is extended or adjusted under 35 U.S.C. 154(b) by 0 days.

(21) Appl. No.: 17/143,240

(22) Filed: Jan. 7, 2021

(65) Prior Publication Data

US 2022/0217106 A1  Jul. 7, 2022

(51) Int. Cl.
*H04L 51/046* (2022.01)
*H04L 51/066* (2022.01)
*H04L 9/40* (2022.01)

(52) U.S. Cl.
CPC .......... *H04L 51/046* (2013.01); *H04L 51/066* (2013.01); *H04L 63/0428* (2013.01); *H04L 63/0838* (2013.01); *H04L 63/123* (2013.01)

(58) Field of Classification Search
CPC . H04L 51/046; H04L 51/066; H04L 63/0428; H04L 63/0838; H04L 63/123
See application file for complete search history.

(56) References Cited

U.S. PATENT DOCUMENTS

2008/0126489 A1* 5/2008 Potluri .................. H04L 51/00
                                                              709/206
2012/0198019 A1   8/2012 Thomas et al.
(Continued)

FOREIGN PATENT DOCUMENTS

WO    WO-2018218046 A1 * 11/2018 ........... H04L 9/3226

OTHER PUBLICATIONS

EPO/RO—European Search Report for European Patent Application No. 22150388.1, dated May 13, 2022, 5 pages.
(Continued)

*Primary Examiner* — Ryan J Jakovac
(74) *Attorney, Agent, or Firm* — McDermott Will & Emery LLP

(57) ABSTRACT

Exemplary embodiments relate to methods and systems for transferring a user's messaging history from one device to another. A user's primary device, storing the official truth of the user's messaging history, establishes an end-to-end encrypted session with a new device, using a first decryption key during initial session setup. The primary device may conglomerate all or a portion of the messages comprising the user's messaging history into a data blob which is encrypted and sent to a blob store. An E2E encrypted message is sent from the primary device to the new device, via an intermediate server. The E2E encrypted message includes a second key for decrypting the data blob and a pointer to the location of data blob on the blob store. The new device retrieves the data blob from the blob store and decrypts the data blob using the second key to extract plaintext versions of the user's messages and adds the messages to the messaging application on the new device. Multiple data blobs may be sent from the primary device to the new device until all or a desired subset of the user's messaging history is present on the new device.

17 Claims, 18 Drawing Sheets

(56) References Cited

U.S. PATENT DOCUMENTS

| | | | | |
|---|---|---|---|---|
| 2012/0322384 A1* | 12/2012 | Zerr | ................... | H04W 4/80 |
| | | | | 455/41.3 |
| 2013/0212200 A1 | 8/2013 | Dennis et al. | | |
| 2014/0235171 A1* | 8/2014 | Molettiere | ........... | A61B 5/7455 |
| | | | | 455/41.2 |
| 2016/0028699 A1* | 1/2016 | Ambroz | ............... | H04L 9/3242 |
| | | | | 713/168 |
| 2019/0222325 A1* | 7/2019 | Klassen | ................ | H04B 17/14 |

OTHER PUBLICATIONS

The Way back Machine, "Backup and Restore all Outlook data—HowTo-Outlook," Jun. 29, 2016, [Retrieved on May 12, 2022], 9 pages, Retrieved from Internet: http://web.archive.org/web/20160629195614/http://www.howto-outlook.com.

The Way Back Machine, "Restoring a pst-file of a POP3 account on a New Computer—MSOutlook.info," Jun. 13, 2016, [Retrieved on May 12, 2022], 5 pages, Retrieved from the Internet: URL:http://web.archive.org/web/20160613061252/https://www.msoutlook.info/question/700.

\* cited by examiner

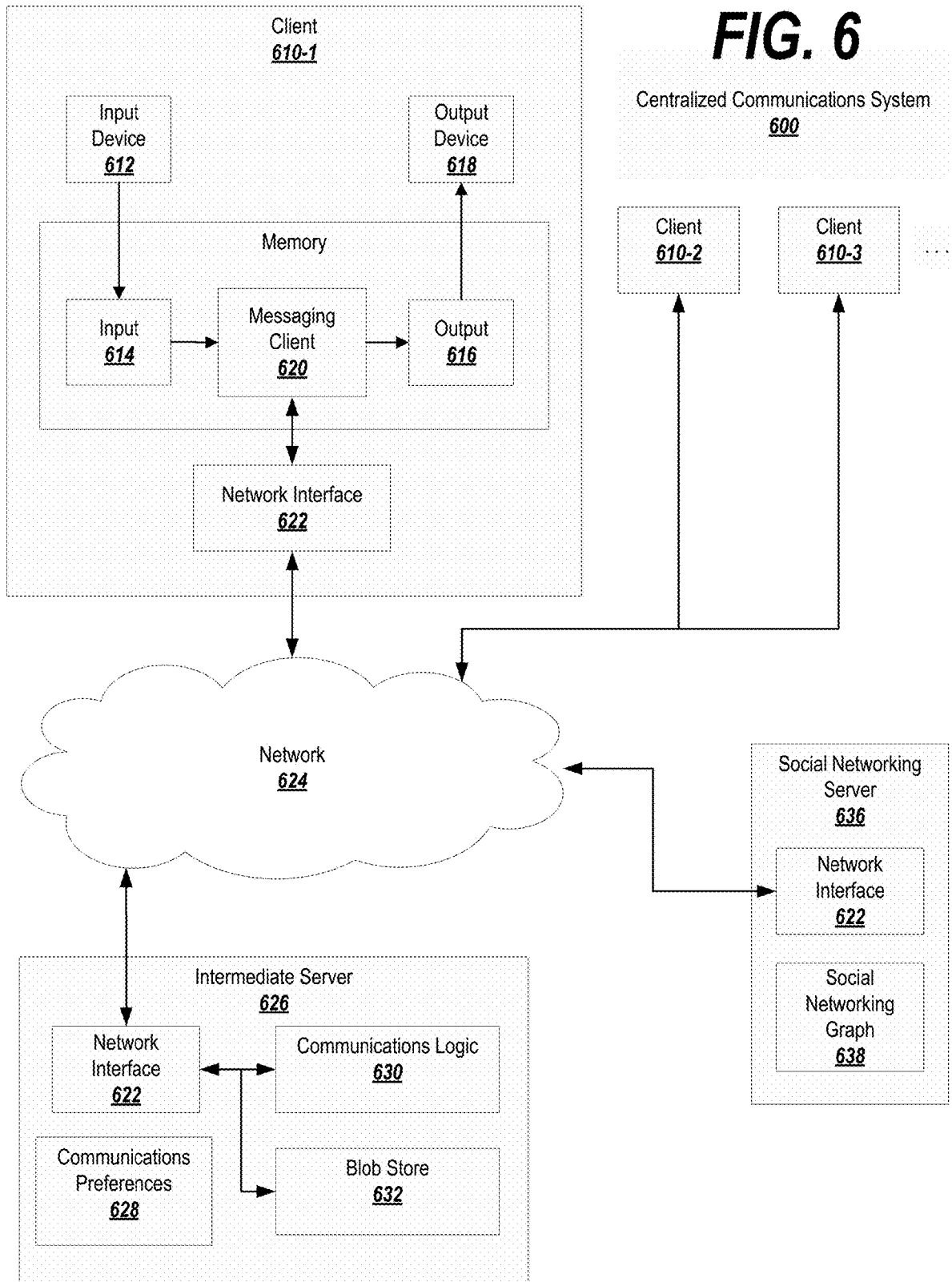

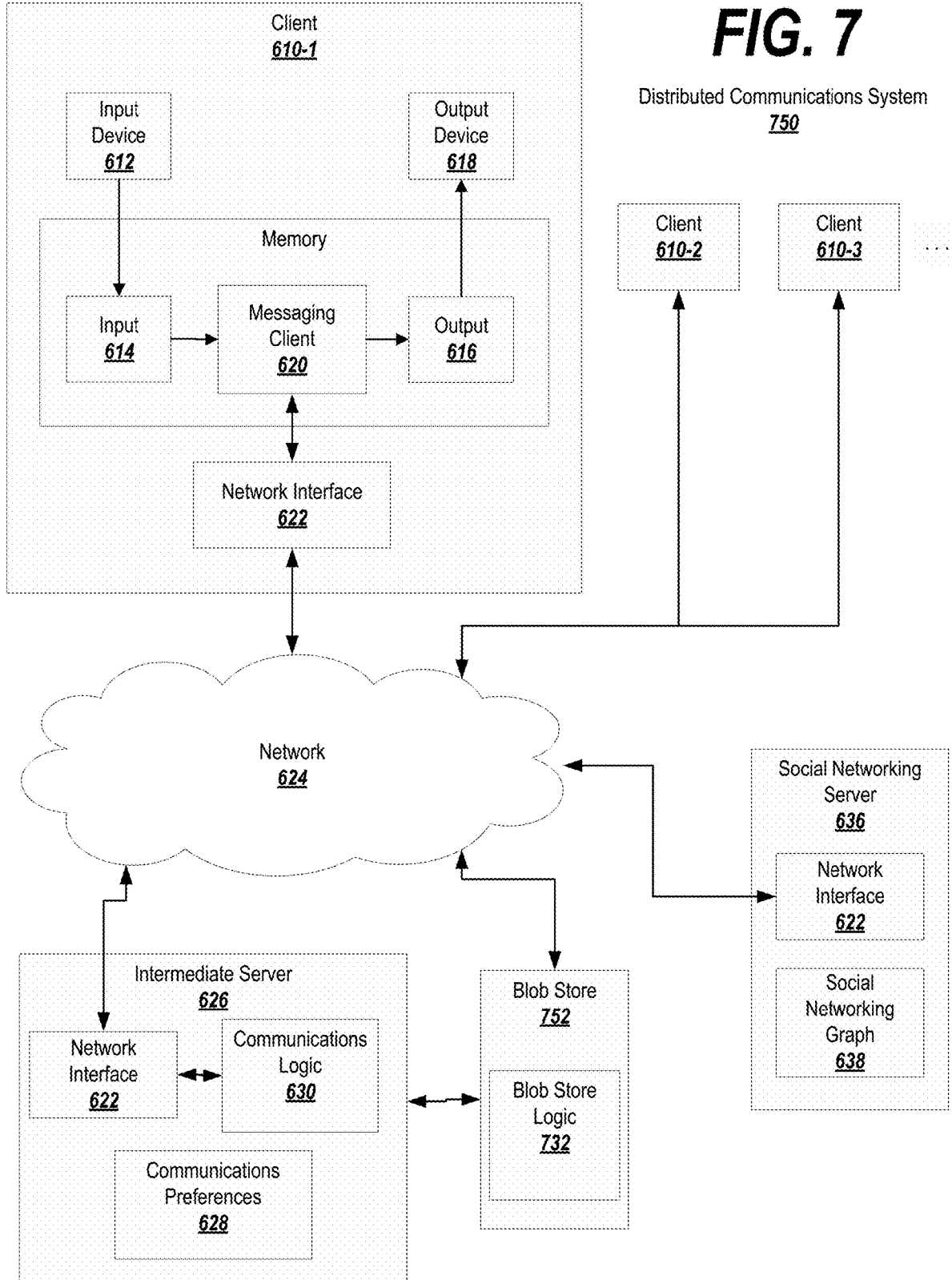

METHODS AND SYSTEMS FOR END-TO-END ENCRYPTED MESSAGE HISTORY EXCHANGE

BACKGROUND

Some messaging services, for example email services, SMS services and instant messaging services, allow users to have multiple devices from which the service may be accessed. For example, the messaging service may be accessed via a mobile phone or tablet having a messaging application specific to the messaging service installed thereon or via a desktop computer, which may access the messaging service via an installed application or via a web browser.

In some instances, one of the user's devices may be considered the official truth with respect to the user's history regarding the use of the messaging service. For example, the user's mobile phone may be considered the official truth with respect to the users messaging history. It may be possible to add an additional device from which the user may access the messaging service. In such cases, it may be desirable that the device considered to carry the official truth of the messaging history share the user's messaging history with the new device, such that the user may have a common experience regardless of the device being used to access the messaging service.

BRIEF DESCRIPTION OF THE DRAWINGS

FIG. 6 is a block diagram providing an overview of a system including an exemplary centralized communications service.

FIG. 7 is a block diagram providing an overview of a system including an exemplary distributed communications service.

DETAILED DESCRIPTION

Figure 1A:
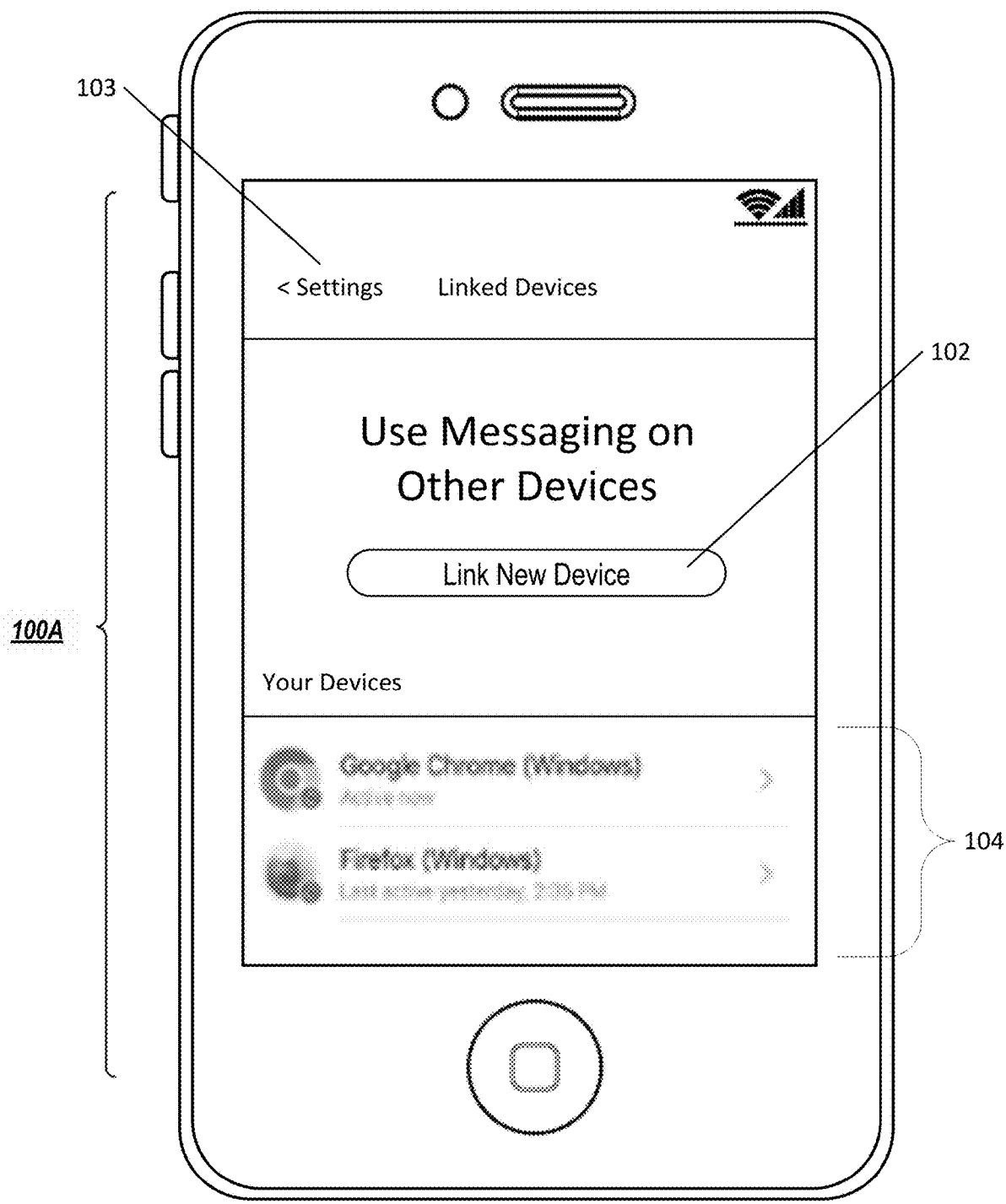
FIG. 1A depicts an exemplary interface listing currently linked devices for a user's messaging account within a messaging application, as well as a user-selectable button to initiate the process to link a new device to the user's messaging account.

Exemplary embodiments relate to techniques for the secure sharing of a user's messaging history between devices owned by the user. When the user adds a new device capable of accessing the user's messaging account with a messaging service, the user's device carrying the official truth of the user's messaging history (the "primary device") may pair with the new device and initiate the transfer of the user's messaging history from the primary device to the new device.

In embodiments of the invention, the user's messaging history is transferred from the primary device to the new device through a server. Messages comprising the user's messaging history may be bundled into data blobs, encrypted, and sent to a blob storage server, from which the new device may download the encrypted data blob and decrypt the encrypted data blob to obtain the messages comprising the user's messaging history. The messages may then be added to the messaging application on the new device.

In certain embodiments, the primary device and the new device may require pairing prior to the transfer of the user's messaging history. The pairing may be accomplished in various ways, but in the preferred embodiment of the invention, the primary device may read a Quick Response (QR) code from the display of the new device. The QR code may encode various data useful or necessary for the primary device to pair with the new device. For example, the QR code may encode, inter alia, the server address of the new device, a public encryption key for the new device, and a unique device identification of the new device.

Upon displaying the QR code, the new device may be placed in a "ready to pair" state. When the primary device has decoded the information in the QR code, the primary device may request pairing with the new device through an intermediary server. The primary device may include, with the request, the information extracted from the QR code read scanned from the new device. When the information accompanying the request has been verified by the intermediary server, the intermediary server sends a message to the new device indicating that the state of the new device should switch from "ready to pair" to "paired". From the point of view the intermediary server, the user's account is now associated with both the primary device and the new device (and any other devices that have previously been authorized for the user's account).

Once the primary device receives confirmation from the server that it has been successfully paired with the new device, the primary device can initiate the transfer of the user's messaging history to the new device.

The primary device may first establish a signal session with the new device and open an end-to-end (E2E) encrypted messaging channel between the primary device and the new device which allows the exchange of encrypted messages between the primary device and the new device.

The primary device may select a subset of the messages in the user's messaging history and copy them to a data blob. The data blob is then encrypted by the primary device. After the primary device encrypts the data blob, it then creates a message authentication code (MAC). The primary device sends a message comprising the encrypted data blog and the MAC to the server, where it is temporarily stored.

The size of the data blob and, as a result, the number of messages that can be fit within the data blob may be hardwired or may be selectable by the primary device. The size of the data blob may be settable by the primary device based upon user preference, current network conditions, for example, available bandwidth, or the type of connection through which the primary device communicates with the server (e.g., cellular data connection versus a WiFi connection).

The primary device may select the messages for inclusion in the data blob based on a heuristic which is discussed later herein. In some embodiments, it may be preferable to give preference to unread messages in the earlier data blobs over those messages which have already been read, which may be sent in later data blobs. In some embodiments, preference may be given to including a most recent message from each open message conversation to be included in the earlier data blobs and sending the rest of the messages from the message conversations in later data blobs. In addition, is not necessary that the entire messaging history of the user be sent to the new device. Depending upon the type of device, a subset of the messages may be chosen based on, for example, a most recent time period during which messages were sent or received. In addition, the most recent time period may be set based on the type of device. For example, the time period may be set longer for a desktop computing device as opposed to a shorter time period being set for device which accesses the messaging service via a web browser.

Once the server has successfully stored the data blob received from the primary device, it notifies the primary device and provides to the primary device a pointer (e.g., a URL) to the data blob storage location on the server.

The primary device then sends an encrypted message to the new device via the E2E encrypted messaging channel. The message may include, inter alia, an encryption key which may be used by the new device to decrypt the data blob, the HMAC key which was used to create the MAC that accompanied the encrypted data blob to the messaging server, a hash of the data blob, and the pointer to the data blob on the server, which was received by the primary device from the server.

Upon receipt and decryption of the encrypted message via the E2E encrypted messaging channel, the new device may retrieve the data blob and the MAC from the server using the pointer included in the message. The new device may decrypt the data blob using the encryption key received from the primary device in the encrypted message and may verify the contents by generating a MAC using the HMAC key included in the encrypted message and comparing the generated MAC with the MAC received with the data blob from the server. Once the data blob has been verified, the messages include in the data blob may be loaded into the messaging application on the new device. Upon successful retrieval and decrypting of the data blob by the new device, the new device may send a message to the primary device via the E2E encrypted messaging channel indicating the success of the operation.

The primary device may repeat the above process any number of times required to transfer the user's messaging history or desired subset of the user's messaging history to the new device. The server may store the data blobs for a period of time to provide the new device an opportunity to download the data blobs, in the case where the new device loses connectivity with the server during the transfer process.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the figures.

A Note on Data Privacy

Some embodiments described herein make use of training data or metrics that may include information voluntarily provided by one or more users. In such embodiments, data privacy may be protected in a number of ways.

For example, the user may be required to opt-in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth to provide a thorough understanding thereof. However, the novel embodiments can be practiced without these specific details. In other instances, well known structures and devices are shown in block diagram form to facilitate a description thereof. The intention is to cover all modifications, equivalents, and alternatives consistent with the claimed subject matter.

FIG. 1A depicts an exemplary interface 100A from a messaging application on a primary device. The primary device is the user's device that will be used as the official truth of the messaging history of the user. In some embodiments, the user's mobile phone may be considered the desired primary device. Interface 100A may display a listing of other devices 104 which are currently linked to the user's messaging account and may enable the user to link a new device to the user's messaging account. Interface 100A may be reached from within the messaging application, for example, by going to the "Settings" menu of the messaging application and selecting a "Linked Devices" menu item. The user may be able to return to the "Settings" menu by selecting "Settings" button 103. In other embodiments, other methods of reaching interface 100A may be used. To link a new device, the user simply selects "Link New Device" button 102. New devices may be, for example, other mobile computing devices including, but not limited to, smartphones, tablets, desktop computers, web browsers or other messaging applications. In some cases, the new device may have the same messaging application installed thereon as the primary device.

Figure 1B:
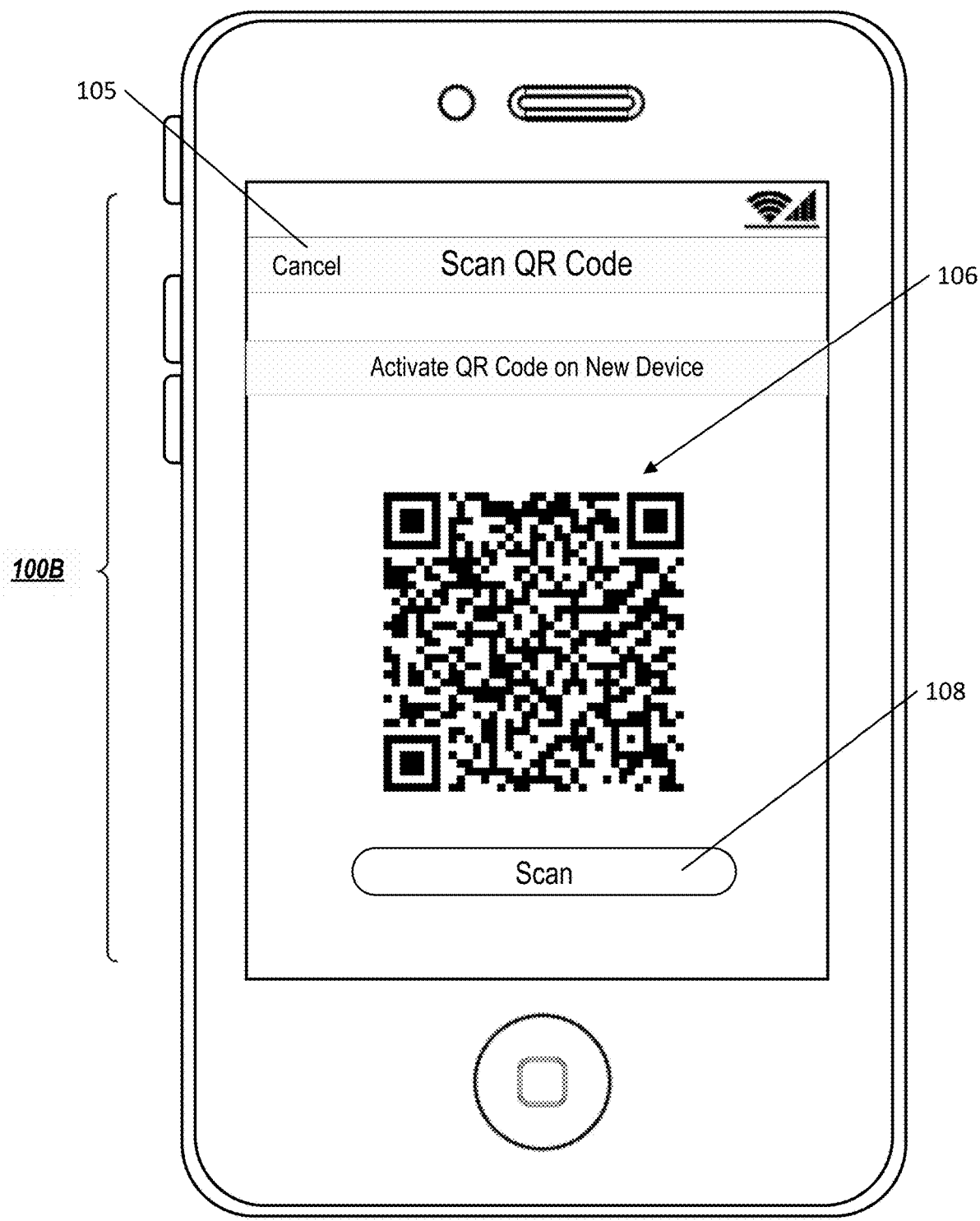
FIG. 1B depicts an exemplary interface for a messaging application in which a QR code is scanned from a new device to be added to the user's messaging account.

Selection of button 102 in interface 100A will cause the display of the primary device to transition to interface 100B, shown in FIG. 1B. Interface 100B allows the user to scan a QR code displayed on a new device (i.e. the device the user wishes to add to the user's messaging account) which contains information required to pair the primary device with the new device. In other embodiments, other instructions and capabilities may be provided on the screen, depending upon the method used by the messaging application to obtain the pairing information from the new device. For example, the user may be instructed to hold the primary device and the new device in close proximity to each other such that a near field connection may be established to transfer the information. The user may cancel the scanning operation by selecting the "Cancel" button 105. Selection of button 105 will cause the display of the primary device to transition back to interface 100A.

Interface 100B instructs the user to activate the QR code on the new device, which means that the user should cause the QR code to be displayed on the display of the new device. Once a QR code is displayed on the new device, the user may initiate the scanning operation by selecting the "Scan" button 108. To scan the QR code, the primary device may activate a built-in camera device (not shown) on the primary device. In certain instances, the messaging application may ask permission from the user to allow the messaging application access to the primary device's camera. The image generated by the camera may appear as image 106 to assist the user in the aligning the camera lens with the QR code displayed on the new device. Once the QR coder has been scanned, the messaging application on the primary device may automatically decode the QR code and initiate the transfer of the user's messaging history to the new device without further intervention from the user. The display of the primary device may transition to a default screen of the messaging application.

Figure 1C:
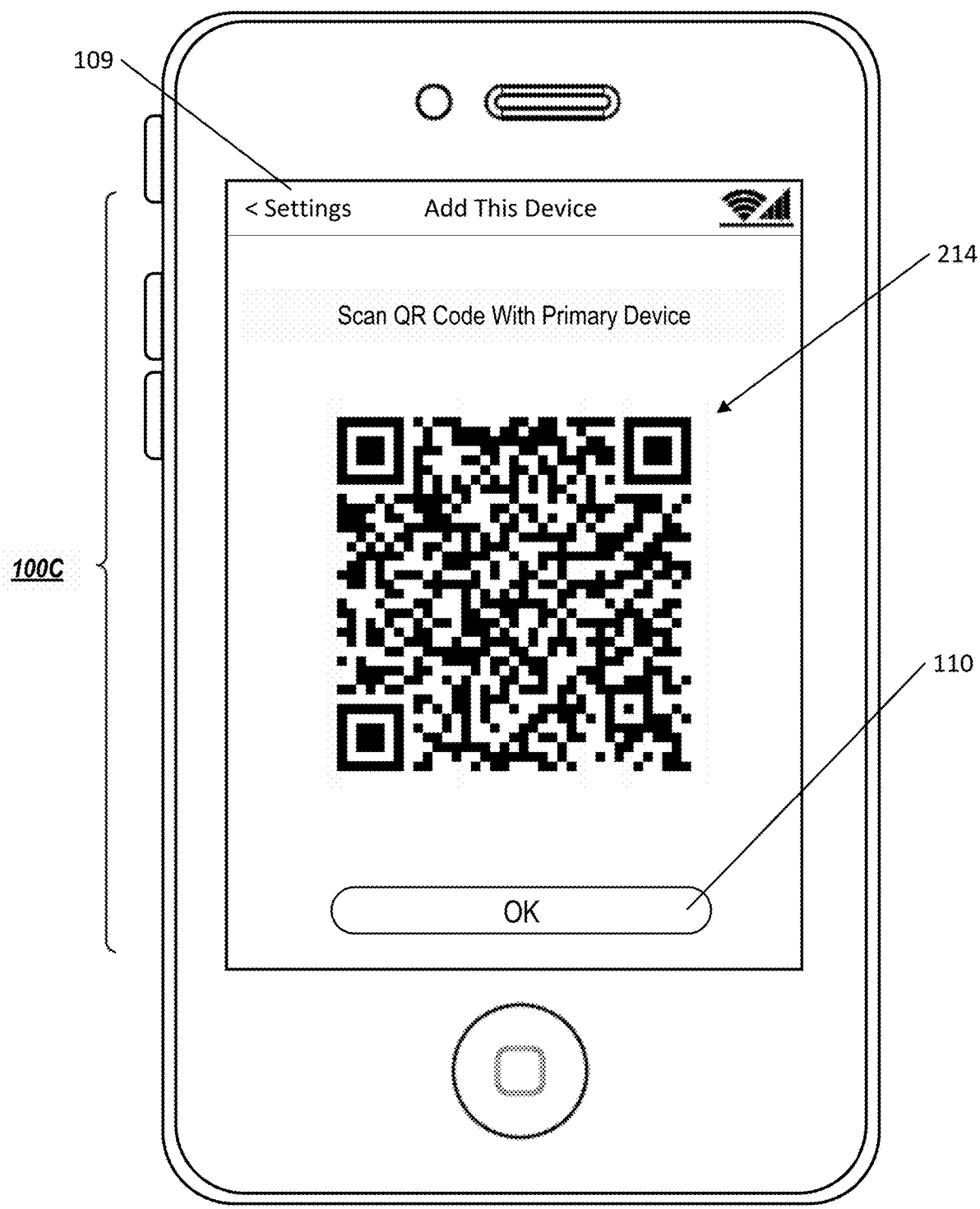
FIG. 1C depicts an exemplary interface for messaging application on a new device in which a QR code is displayed such as to allow the QR code to be scanned by the primary device of the user's messaging account.

FIG. 1C shows interface 100C displayed on the new device. To reach the screen, in one embodiment, the user may go to the "Settings" menu of the messaging application on the new device and select the "Add This Device" menu item. In other embodiments other methods of reaching the screen may be used. To return to the settings menu and cancel the operation, the user may select "Settings" button 109. QR code 214, containing information necessary to pair the new device with the primary device is displayed in interface 100C on the display of the new device and the user is instructed to scan the QR code with the primary device. Once the QR code has been scanned by the primary device, the user may select the "OK" button 110 to return to a default screen of the messaging application. In other embodiments, which may use other means to transfer the pairing information from the new device to the primary device, other interfaces may appear in lieu of interface 100C, as appropriate.

Initiation of Message History Transfer

Figure 2A:
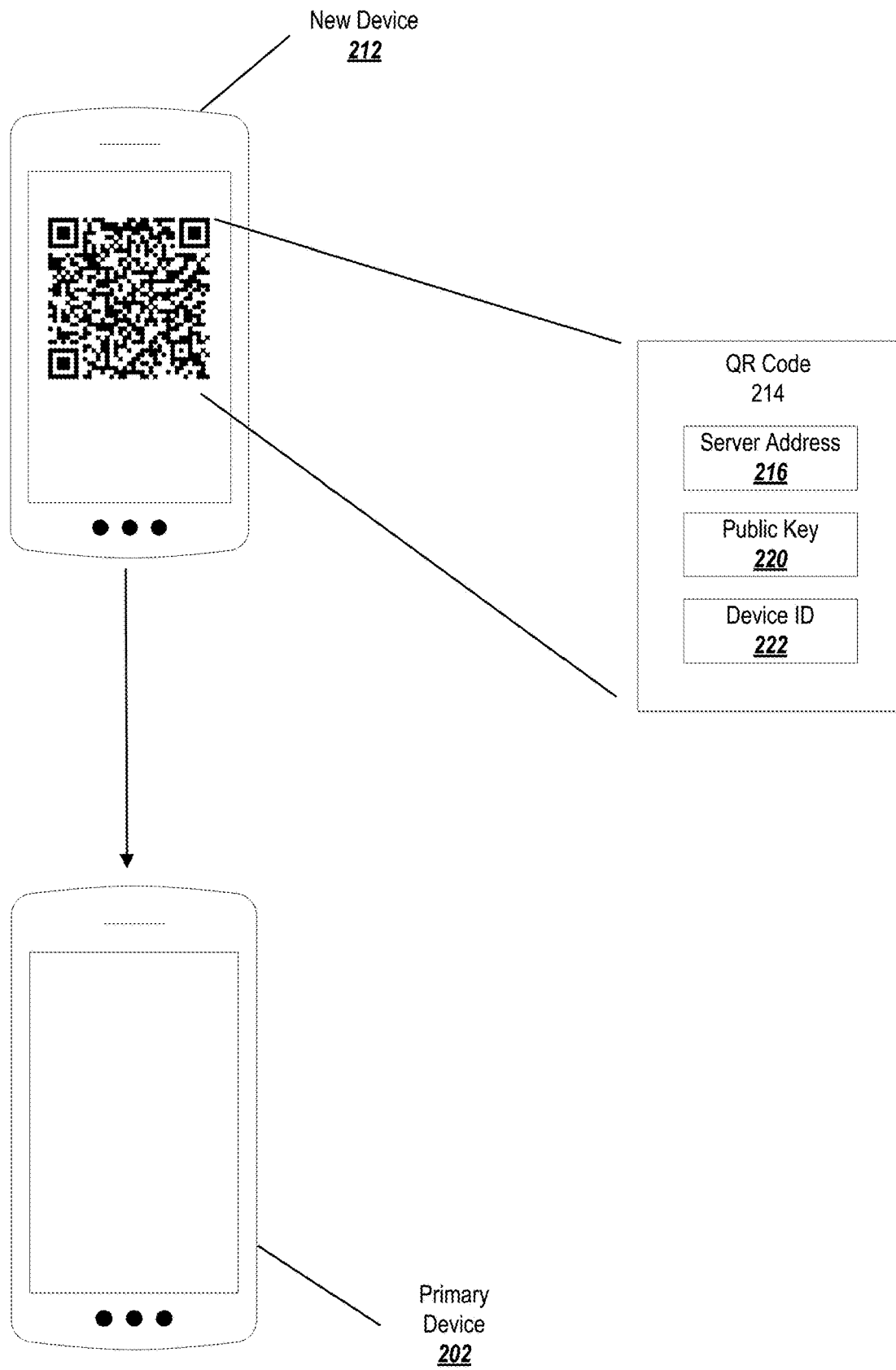
FIG. 2A is a schematic representation of the transfer of a QR code from a new device to a primary device showing the breakout of the data contained in the QR code.

The initiation of the transfer of the user's messaging history from the primary device 202 to the new device 212 will now be discussed with reference to FIGS. 2(A,B). When the user wishes to add a new device 212, the new device 212 must first be authorized prior to the primary device 202 sharing the user's messaging history with the new device 212. This authorization is provided when the new device 212 and the primary device 202 become paired. In preferred embodiments of the invention, the pairing may be initiated by having the new device 212 display a QR code on its display and having the primary device 202 read the QR code from the new device 212. This is shown in FIG. 2A.

Upon receiving a user input from the user indicating that the new device 212 should be paired with the primary device 202, the new device 212 may create a private/public key pair and generate a QR code 214. The QR code 214 may be generated by the messaging application of new device 212 or by another application on the new device 212. The QR code 214 may contain, for example, an address 216 of the new device on intermediate server 204, the public key 220 from the private/public key pair created buy new device 212 and a device ID 222 uniquely identifying the new device 212. In other embodiments of the invention, other data may be present in QR code 214 in place of or in addition to the described contents.

Primary device 202 then reads the QR code 214 from the display of new device 212. In some embodiments, QR code 214 is read by the messaging application on primary device 202, which accesses a camera on primary device 202 to image QR code 214. In other embodiments, another application may obtain an image QR code 214 on behalf of the messaging application by accessing the camera device on primary device 202. In any case, QR code 214 is decoded and the information mentioned above is extracted. Once new device 212 has displayed QR code 214 it is placed into a "ready to pair" state awaiting confirmation that the primary device 202 has paired with it.

Primary device 202 may send a request to intermediate server 204 requesting a pairing with new device 212. The request may include some or all of the information extracted from QR code 214. Once intermediate server to 204 has received the request, it sends a notification to new device 212 and to primary device 202 that the devices have been paired. From the point of view of intermediate server 204, new device 212 now belongs to the same user account as primary device 202. Primary device 202 is now free to initiate the transfer of the user's messaging history from primary device 202 to new device 212.

Requiring the reading of a QR code by primary device 202 from the display of new device 212 requires that the devices be in close proximity to each other to become paired. The requirement the device as being in close proximity to each other to become paired may be a security feature. In alternate embodiments of the invention, the information contained in QR code 214 may be transferred from the new device 212 to the primary device 202 via any other known means, for example, via a Bluetooth connection, a Wi-Fi connection, a near field connection or any other type of connection between new device 212 and primary device 202.

Because the transfer of the user's messaging history from primary device 202 to new device 212 requires both E2E encrypted message exchange and the transfer of encrypted data blobs, exemplary facilities for exchanging E2E encrypted messages and for sending encrypted data blobs from the primary device 202 to the new device 212 will now be described.

Exemplary End-to-End Encryption System

Figure 2B:
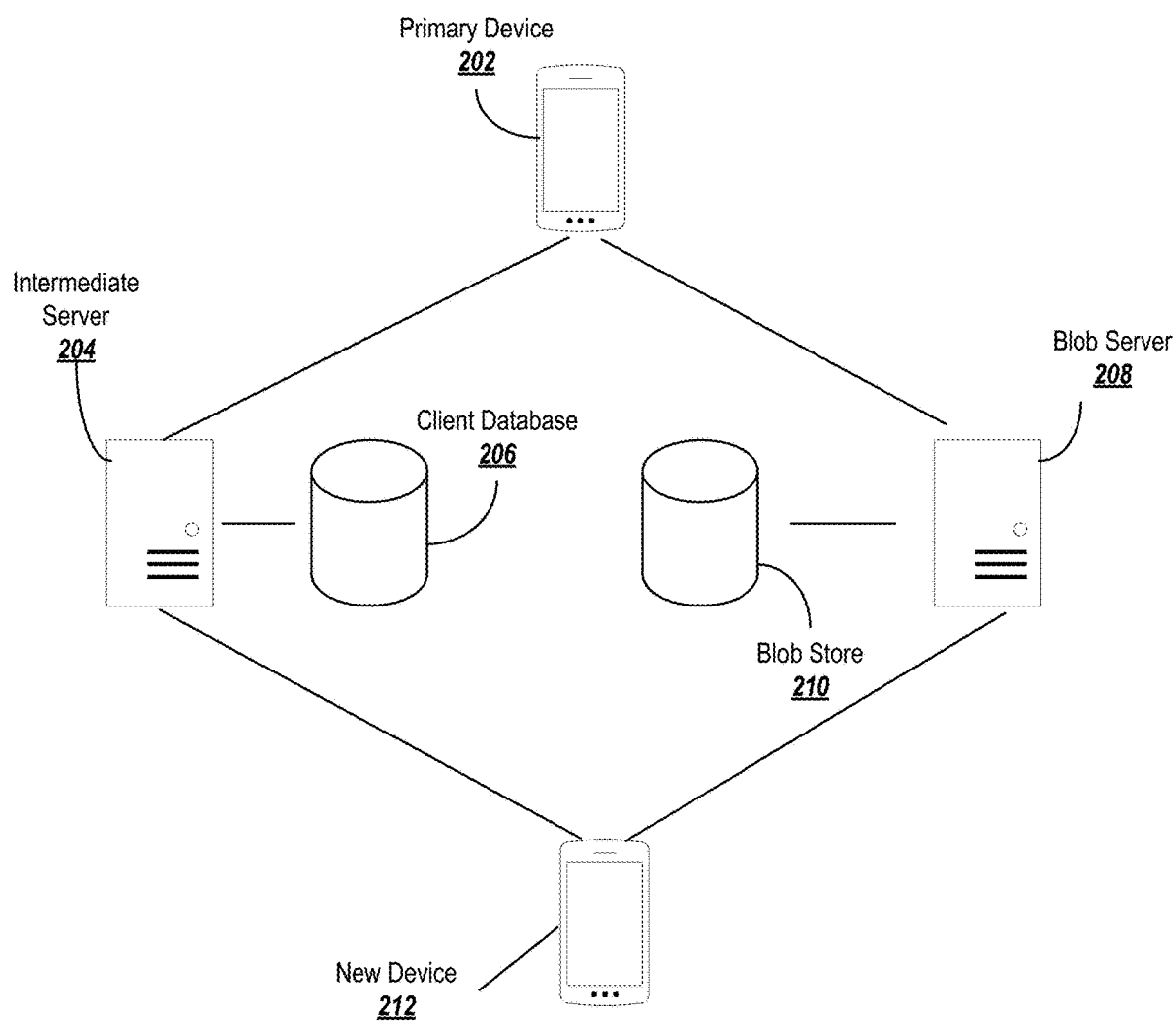
FIG. 2B depicts an exemplary system suitable for applying end-to-end encryption to a message.

As shown in FIG. 2, exemplary embodiments providing end-to-end (E2E) encryption between a primary device 202 and a new device 212 may be facilitated by an intermediate server 204. All communication between devices 202, 212 and intermediate server 204 may be layered within a separate encrypted channel. E2E-capable devices may use, for example, Noise Pipes with Curve25519, Advanced Encryption Standard Galois/Counter Mode (AES GCM), and Secure Hash Algorithm 256 (SHA256) from the Noise Protocol Framework for long running interactive connections. The parameters for setting up the encrypted channel may be stored in a client database 206 at the intermediary server 204.

Such a configuration provides several desirable properties, including: fast, lightweight connection and resume; encryption of metadata to hide it from unauthorized network observers; information about the connecting user's identity is not revealed; and no client authentication secrets are stored on the intermediate server 204. Devices may authenticate themselves using a Curve 25519 key pair, so the server only stores a device's public authentication key. If the server's user database 206 is ever compromised, no private authentication credentials will be revealed.

To transmit media and/or attachments in an encrypted manner, the communications system may also include a blob server 208 hosting a blob store 210. Use of the blob store 210 to transmit content (particularly in conjunction with sending data blobs containing messages histories) is described in more detail below.

Exemplary Encryption Protocol and Data Structures

This section describes an exemplary encryption protocol and data structures suitable for use in end-to-end encryption. Although embodiments are illustratively described herein with regards to specific examples, the present invention is not limited to the examples described. Some aspects described herein may be used with any type of communications system or encryption protocol, while others may be preferably employed in connection with an end-to-end encrypted communications system.

An example of an encryption protocol suitable for use with exemplary embodiments is the Signal Protocol designed by Open Whisper Systems of San Francisco, Calif. Exemplary embodiments may also utilize the anonymous key agreement protocol Elliptic Curve Diffie-Hellman (ECDH). Nonetheless, other encryption protocols and key agreement protocols may also be suitable for use with exemplary embodiments.

Advantageously, end-to-end encrypted protocols may prevent third parties (and even the communications service itself) from having plaintext access to messages transmitted by the service. Even if encryption keys from a user's device are physically compromised, they cannot be used to go back in time to decrypt previously transmitted messages.

Figure 3A:
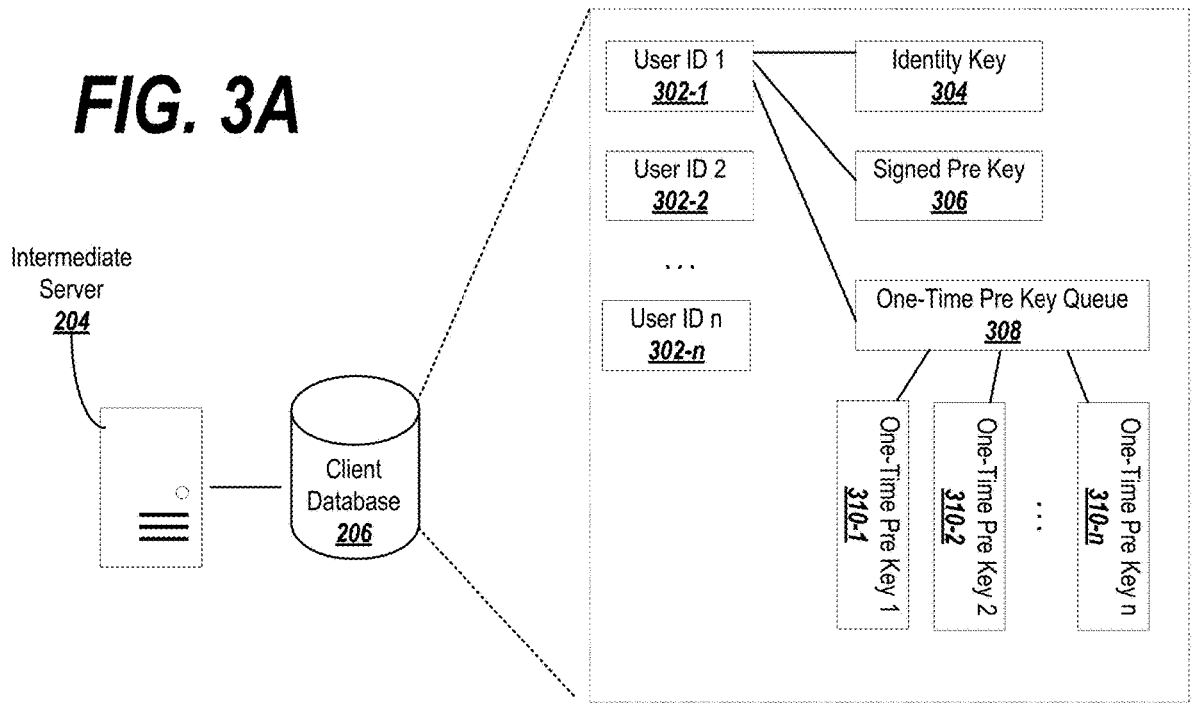
FIG. 3A is a block diagram of a system for setting up and carrying out end-to-end encrypted messaging.

To use end-to-end encryption, a user may initially register with the communications service. The user's registration information may be stored in the client database 206, as shown in FIG. 3A. Each user may be associated with an entry $302\text{-}i$ indexed by an identifier assigned to the user account.

At registration time, an application of the communications service associated with the registering user may transmit a public identity key 304, a public signed pre key 306 with its signature, and a batch of public one-time pre keys $310\text{-}i$ to the intermediate server 204.

In one embodiment, the identity key 304 may be a long-term Curve25519 key pair, generated at the time that the application is installed on the client device. The signed pre-key 306 may be a medium-term Curve25519 key pair, generated at install time and signed by the identity key. The signed pre-key 306 may be rotated on a periodic basis. The one-time pre keys $310\text{-}i$ may be a queue 308 of Curve25519 key pairs for one-time use, generated at install time, and replenished as needed.

The server 204 may store these public keys 304, 306, $310\text{-}i$ associated with the user's identifier $302\text{-}i$. According to exemplary embodiments, at no time does the server 204 have access to any of the client's private keys.

Figure 3B:
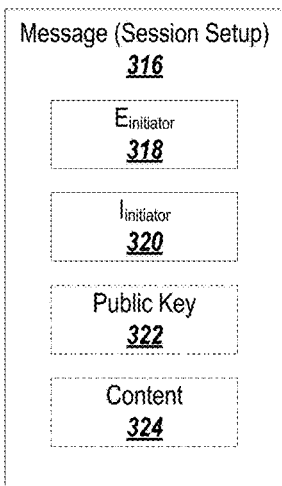
FIG. 3B depicts an exemplary data structure representing a message including session setup information.

The information from the client database 206 may be used to initiate an end-to-end encrypted session; using the session information, end-to-end encrypted messages may be exchanged until the session is ended or expires. Once the session is established, clients do not need to rebuild a new session with each other until the existing session state is lost (e.g., through an external event such as an app reinstall or device change). FIG. 3B depicts an exemplary message 316 suitable for establishing an end-to-end encrypted session.

To establish a session, the client initiating the session (the "initiator", in this case, primary device 202) may request the public identity key 304, public signed pre key 306, and a single public one-time pre key $310\text{-}i$ for the recipient (in this case, new device 212).

In response, the server 204 may return the requested public key values. A one-time pre key $310\text{-}i$ is only used once, so it is removed from the server storage after being requested. The initiator may save the recipient's identity key 304 as $I_{recipient}$, the signed pre key 306 as $S_{recipient}$, and the one-time pre key $310\text{-}i$ as $O_{recipient}$.

The initiator may then generate an ephemeral Curve25519 key pair as $E_{initiator}$ 318. The initiator may load its own identity key 304 as $I_{initiator}$ 320. The initiator may calculate a master secret as:

$$\text{master\_secret} = \text{ECDH}(I_{initiator}, S_{recipient}) \| \text{ECDH} \\ (E_{initiator}, I_{recipient}) \| \text{ECDH}(E_{initiator}, S_{recipient}) \\ \| \text{ECDH}(E_{initiator}, O_{recipient}) \quad (1)$$

If there is no one-time pre key 310-$i$ (e.g., the keys in the queue 308 had been exhausted when the initiator requested such a key and had not been replenished by the recipient), then the final ECDH may be omitted.

The initiator may use a Hashed Message Authentication Code (HMAC)-based key derivation function (HKDF) to create a root key and chain keys from the master secret, as discussed in more detail below. A root key may be a 32-byte value that is used to generate chain keys. A chain key may be a 32-byte value used to create message keys. A message key may be an 80-byte value that is used to encrypt message contents. In the message key, 32 bytes may be used for an Advanced Encryption Standard-256 (AES-256) key, 32 bytes may be used for an HMAC Secure Hash Algorithm-256 (HMAC-SHA256) key, and 16 bytes may be used for an initialization vector (IV).

After building a long-running encryption session, the initiator may immediately start sending messages 316 to the recipient, even if the recipient is offline. Until the recipient responds, the initiator may include the information (in the header of all messages sent) that the recipient requires to build a corresponding session. This includes the initiator's $E_{initiator}$ 318 and $I_{initiator}$ 320. Optionally the message may also include a public key 322 and encrypted content 324, as described in connection with FIG. 3C.

When the recipient receives a message 316 that includes session setup information, the recipient may calculate the corresponding master secret using its own private keys and public keys advertised in the header of the incoming message. The recipient deletes the one-time pre key 310-$i$ used by the initiator. The initiator may use HKDF to derive a corresponding root key and chain keys from the master secret.

Once a session is established, clients may exchange messages that are protected with a message key using AES256 in cipher block chaining (CBC) mode for encryption, and HMAC-SHA256 for authentication.

The message key may change for each message transmitted and is ephemeral such that the message key used to encrypt a message cannot be reconstructed from the session state after a message has been transmitted or received.

The message key may be derived from a sender's chain key that ratchets forward with every message sent. Additionally, a new ECDH agreement is performed with each message roundtrip to create a new chain key. This provides forward secrecy through the combination of both an immediate hash ratchet and a round trip Diffie-Hellman (DH) ratchet.

Each time a new message key is needed by a sender, the message key may be calculated as:

$$\text{Message Key} = \text{HMAC-SHA256}(\text{Chain Key}, 0x01) \quad (2)$$

The chain key may then be updated as:

$$\text{Chain Key} = \text{HMAC-SHA256}(\text{Chain Key}, 0x02) \quad (3)$$

This causes the chain key to ratchet forward, and also means that a stored message key can't be used to derive current or past values of the chain key.

Figure 3C:
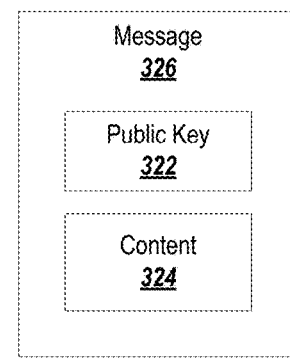
FIG. 3C depicts an exemplary data structure representing a message after session setup has occurred.

As shown in FIG. 3C, each time a message 326 is transmitted, a public key 322 (e.g., an ephemeral Curve25519 public key) may be advertised along with the encrypted message content 324. Once a response is received, a new chain key and root key may be calculated as:

$$\text{ephemeral\_secret} = \text{ECDH}(\text{Ephemeral}_{sender}, \text{Ephemeral}_{recipient}) \quad (4)$$

$$\text{Chain Key}, \text{Root Key} = \text{HKDF}(\text{Root Key}, \text{ephemeral\_secret}) \quad (5)$$

According to exemplary embodiments, a chain is only ever used to send messages from one user, so message keys are not reused. Because of the way message keys and chain keys are calculated, messages can arrive delayed, out of order, or can be lost entirely without causing problems.

Figure 3D:
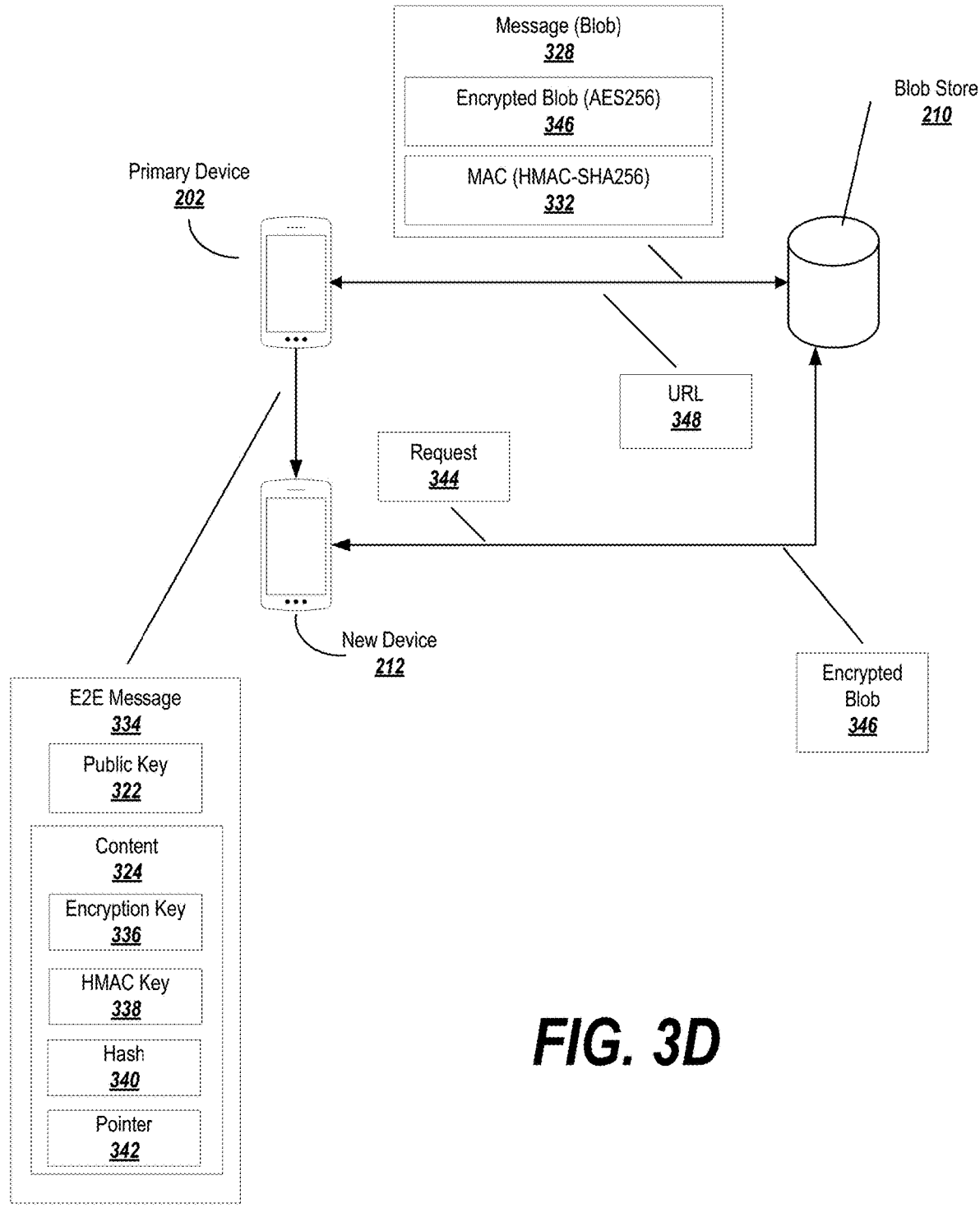
FIG. 3D depicts exemplary messages transmitted in a network to exchange media files in an end-to-end encrypted communications system.

E2E encryption may also be used to transmit media and other attachments, in this case, encrypted data blobs containing messages and message threads comprising the full or partial user messaging history stored on primary device 202, as shown in FIG. 3D. The primary device 202 sending the message 328 may generate an ephemeral 32 byte AES256 key 336, and an ephemeral 32 byte HMAC-SHA256 key 338. The primary device 202 may encrypt the data blob 330 with the AES256 key in CBC mode with a random IV, then append a message authentication code (MAC) 332 of the ciphertext using HMAC-SHA256. The primary device 202 may then upload the encrypted attachment 330 as a data blob to the blob store 210. In response, primary device 202 may receive a pointer to the location of the encrypted blob 330 on blob store 210, for example, a URL 348.

The primary device 202 may then transmit an E2E encrypted message 334 to the new device 212. The E2E encrypted message 334 may be secured using a public key 322, as discussed above. The content 324 of the E2E encrypted message 334 may include the encryption key 336, the HMAC key 338, a SHA256 hash of the encrypted blob 340, and a pointer 342 to the encrypted data blob 346 on blob store 210. The pointer 342 may be the URL 348 received from blob store 210.

The new device 212 may decrypt the content 324 of E2E encrypted message 334 and transmit a request 344 to retrieve (i.e., download) the encrypted data blob 346 stored at the location on blob store 210 indicated by pointer 342. After receiving the encrypted blob 346, the new device 212 may calculate a SHA256 hash of the data blob and verify that the hash matches the hash 340 of the E2E encrypted message 334, may verify the MAC 332, and may decrypt the plaintext.

Because the server does not have access to the encryption key 336, which is itself encrypted in the message 348 in a manner that is only visible to particular to the new device 212, the server is not capable of decrypting the data uploaded to the blob store 210.

This and other aspects of exemplary embodiments are next described in connection with the data flow diagram depicted in FIG. 4.

Exemplary Information Exchange

FIGS. 4(A,B) are exemplary data flow diagrams showing data exchange between a primary device 202, an intermediate server 204, a blob store 210, and a new device 212.

Figure 4A:
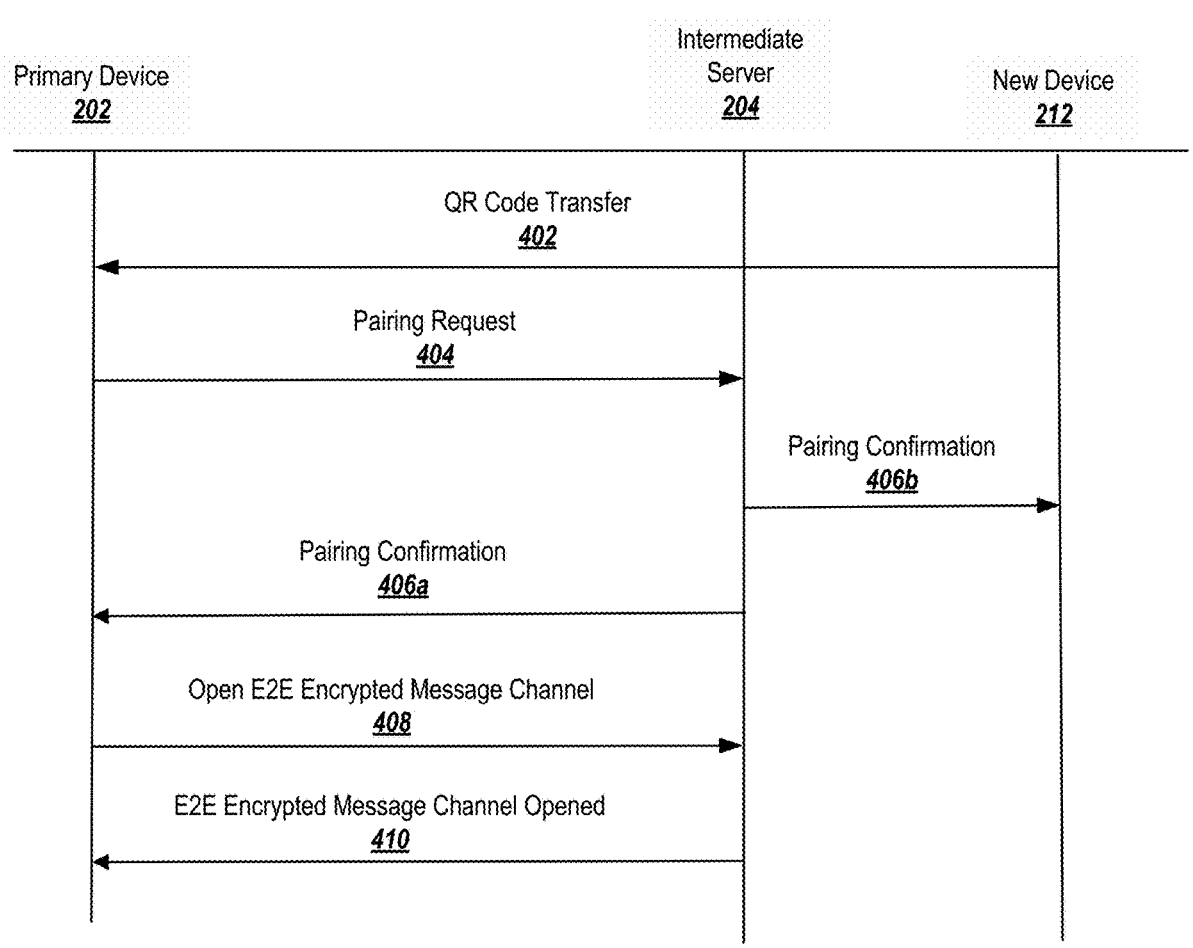
FIG. 4A is an exemplary data flow diagram showing information exchange for pairing devices and initiating an E2E encrypted messaging channel in accordance with embodiments discussed herein.

FIG. 4A shows the data exchange that occurs to set up both the primary device 202 and the new device 212 for transfer of the users messaging history. The setup involves two steps: first, the pairing of the primary device 202 and the new device 212 and, second, the opening of an E2E encrypted messaging channel between primary device 202 and new device 212. At 402, the data in QR code 214 is transferred from the new device 212 to the primary device 202 through the imaging of the QR code 214 by the camera of the primary device 202. After extraction of the information from QR code 214, the primary device 202, at 404, sends a pairing request to intermediate server 204. At 406b, intermediate server 204 sends a pairing confirmation to the new device 212, indicating that the new device 212 and the primary device 202 have been paired. Upon receipt of the pairing confirmation, new device 212 changes its state from "ready to pair" to "paired". At 406a, intermediate server 204 also sends a pairing confirmation to primary device 202. At this point, the devices are now considered to be "paired" and from the point of view of intermediate server 204, both primary device 202 and new device 212 are associated with the messaging account of the user.

At 408, primary device 202 initiates the opening of an E2E encrypted messaging channel between the primary device 202 and new device 212. A session set up message, shown in FIG. 3B, and explained above, is sent to intermediate server 204. Note that it is not necessary for new device 212 to receive or confirm that the E2E encrypted messaging channel has been created. New device 212 may be off-line or otherwise not in communication with intermediate server 204, in which case intermediate server 204 will hold any messages sent from primary device 202 to new device 212 until such time that they can be delivered. At 410, intermediate server 204 sends a confirmation primary device 202 that the E2E encrypted messaging channel has been opened.

Figure 4B:
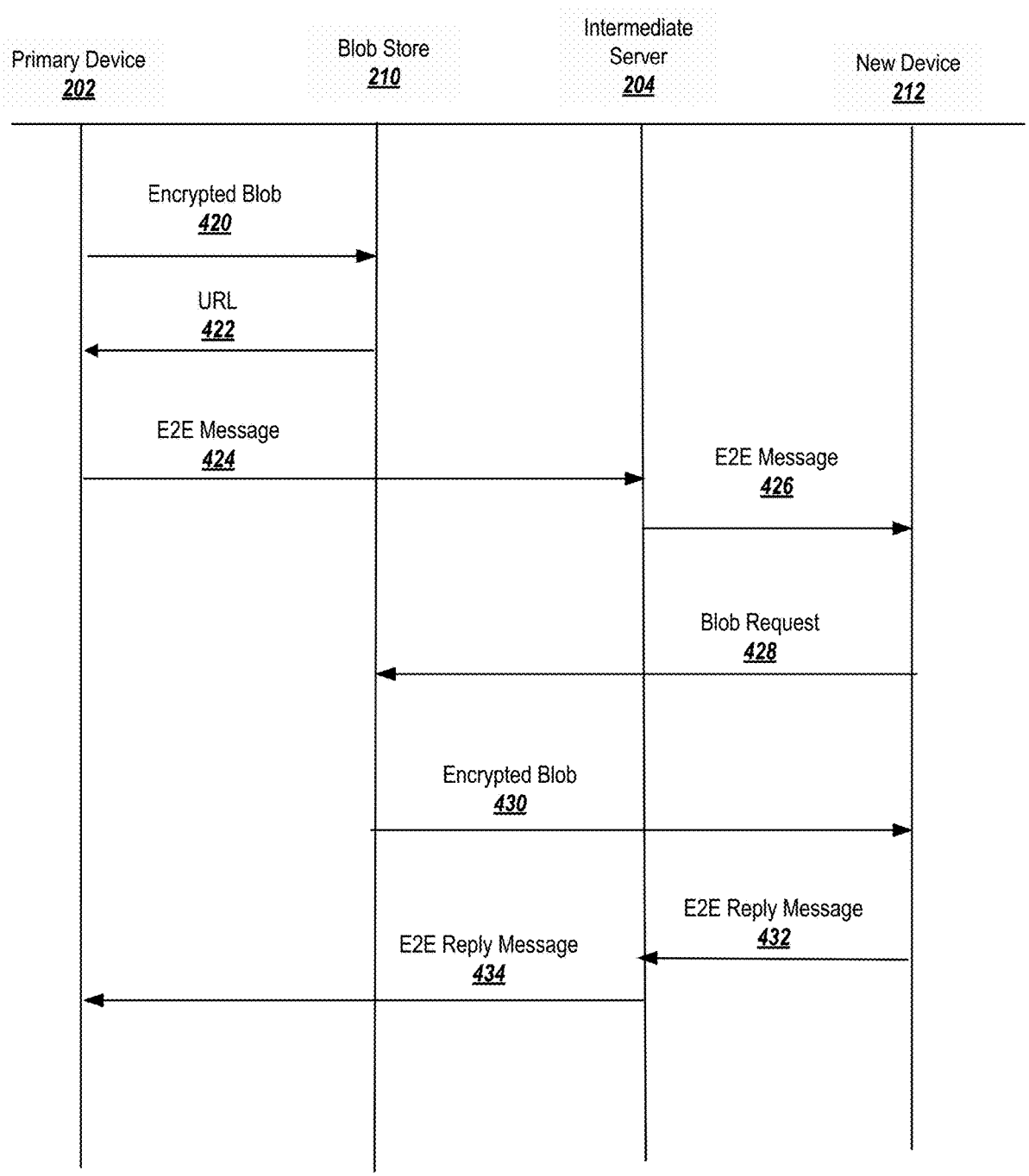
FIG. 4B is an exemplary data flow diagram showing information exchange for the exchange of data blobs and the exchange of E2E encrypted messages containing information necessary to decrypt and verify the data blobs in accordance with embodiments discussed herein.

FIG. 4B shows the data exchange that occurs to transfer the user's messaging history from primary device 202 to new device 212. Primary device 202 forms a data blob comprising a plurality of messages from the user's messaging history. The selection of the messages may be determined heuristically or via user settings, as will be discussed later. Once the data blob has been formed, primary device 202 will encrypt the data blob as described above to form encrypted blob 346. At 420, the encrypted blob 346 is sent from primary device 202 to blob store 210, where it is stored until new device 212 can retrieve it. In response to the successful receipt and storage of the encrypted blob 346, blob store 210 will send the location of the stored encrypted blob 346 to primary device 202. In preferred embodiments of the invention, the location may be encoded in a universal resource locator (URL) 348.

At 424, primary device 202 sends an E2E encrypted message 334 to the new device 212 via intermediate server 204. Intermediate server 204 may store E2E encrypted message 334 until such time as it may be delivered to the new device 212. E2E encrypted message 334 is of the format shown in FIG. 3D and includes information necessary for the new device 212 to retrieve encrypted blob 346 from blob store 210 and to decode encrypted blob 346, as discussed above. At 426, intermediate server 204 sends the E2E encrypted message 334 to the new device 212.

Once new device 212 has extracted the information necessary to retrieve encrypted data blob 346 from blob store 210, new device 212, at 428, sends a request to retrieve the encrypted data blob 346 from blob store 210. In response, blob store 210, at 430, returns encrypted blob 346 to the new device 212. Using information received in the E2E encrypted message 334 from primary device 202, new device 212 may decrypt encrypted data blob 346 to extract encrypted attachment 330, containing all or a portion of the user's messaging history. The contents of the encrypted attachment 330 may be verified using MAC 332, as described above. Once the messages have been extracted and decrypted to plaintext form, they are incorporated into the messaging application at new device 212.

New device 212, at 432, may send an E2E encrypted reply to intermediate server 204 and, at 434, intermediate server 204 forwards the E2E encrypted reply to primary device 202. The E2E encrypted reply may be substantially of the format shown as a media message 334 in FIG. 3D and may indicate to primary device 202 that new device 212 successfully retrieved and decoded encrypted data blob 346. The process shown in FIG. 4B may be repeated any number of times until all or a desired subset of the user's messaging history has been transferred from primary device 202 to new device 212.

Blob store 210 may store one or more encrypted data blob 346 for a predetermined period of time, to allow new device 212 adequate opportunity to retrieve them. As an example, new device 212 may experience a delay in receiving E2E encrypted message 334 from primary device 202 for any one of a number of reasons, including, for example, new device 212 may be out of power, off-line, or otherwise unable to communicate with intermediate server 204 to receive E2E encrypted message 334 or with blob store 210 to retrieve encrypted data blob 346. After the predetermined period of time, blob store 210 may consider encrypted data blob 346 to be expired, at which time, encrypted data blob 346 may be deleted from blob store 210.

FIGS. 4(A,B) do not explicitly show various failure scenarios, which may include, for example, the failure of the devices to pair with each other, a failure to open the E2E encrypted messaging session, or the failure to transfer any one of the encrypted blob 346 from primary device 202 does new device 212. It should be noted that, should the new device 212 fail to successfully retrieve the first encrypted data blob 346, primary device 202 and new device 212 may become unpaired and the pairing process may need to be reinitiated as shown in FIG. 4A.

Exemplary Logic

Exemplary logic for implementing the above-described embodiments is next described in connection with FIGS. 5(A,B). The exemplary logic may be implemented in hardware, software, or a combination of hardware and software (e.g., being implemented at least partially in hardware).

Figure 5A:
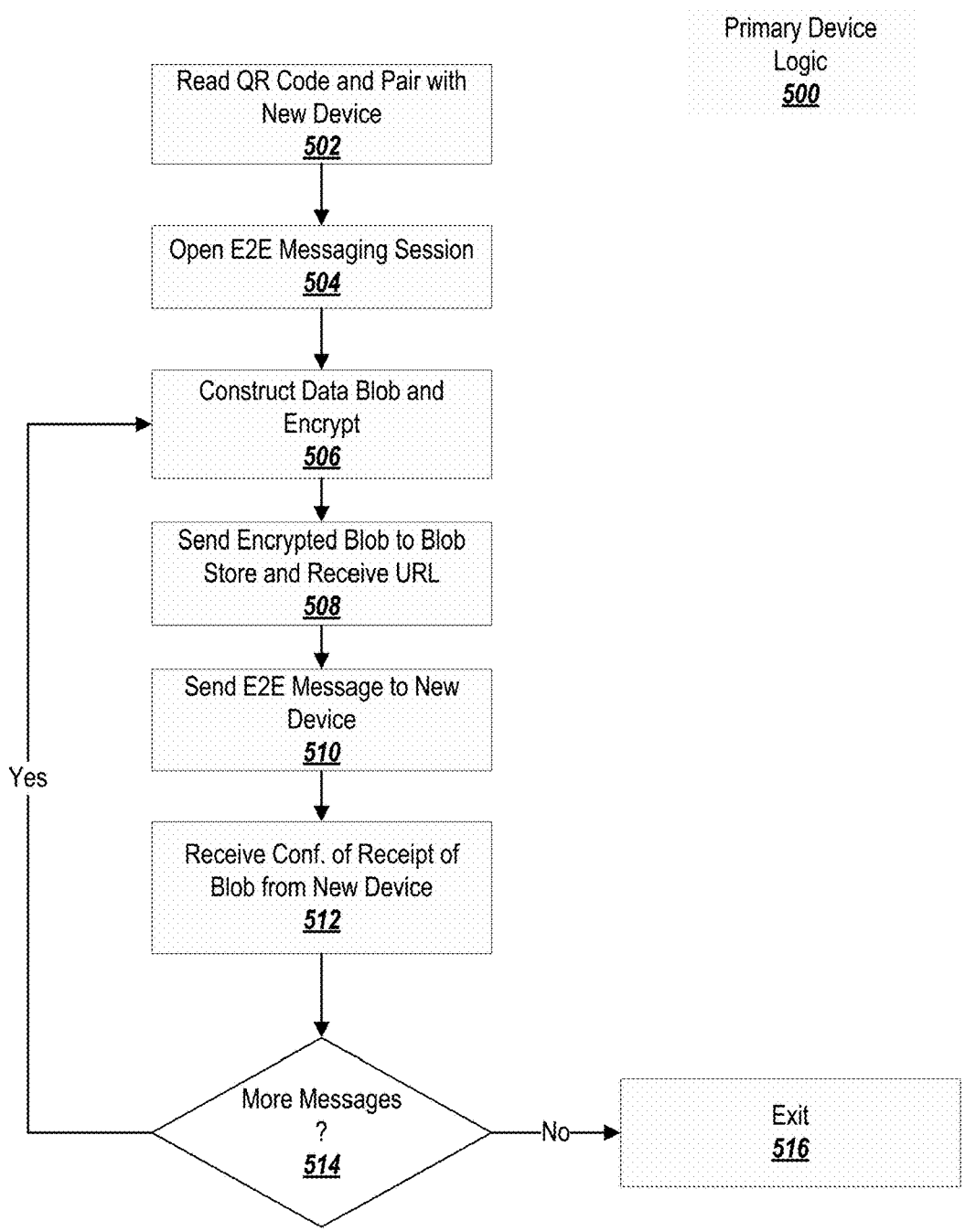
FIG. 5A is a flowchart depicting exemplary primary device logic for transferring a user's messaging history to a new device.

FIG. 5A is a flowchart depicting exemplary logic 500 performed by a system, such as primary device 202, for transferring a user's messaging history to a new device.

At block 502, the primary device 202 receives pairing data from a new device 212 and sends a request to a server to pair with the new device. In preferred embodiments of the invention, the pairing data is read by imaging a QR code displayed on the display of the new device 212 using a camera of primary device 202. However, in other embodiments, the pairing data may be transferred using any known method of communication between primary device 202 and new device 212.

At block 504, the primary device 202 initiates an E2E encrypted messaging session with the new device 212. The E2E encrypted messaging session allows the sending of secure messages between the primary device 202 and the new device 212, as previously described. In embodiments of the invention, encrypted messages sent from primary device 202 to new device 212 will contain information necessary for new device 212 to read encrypted data blobs from a blob store 210, decrypt the encrypted data blobs 346 and verify the contents of the data blobs.

At block 506, primary device 202 will construct a data blob which comprises all or a subset of messages from the messaging application on the primary device 202. In preferred embodiments of the invention, the messages included in the data blob will include the messages only and will not include any media attachments to those messages. It is presumed that the new device 212 will be able to retrieve any media attachments to the messages in a manner identical to the method used by the primary device 202 to retrieve the media attachments.

The order in which messages are selected for inclusion in data blobs made be determined heuristically or via a set of user preferences. For example, unread messages may be considered a higher priority than read messages and may be included in the earlier data blobs, while read messages may be considered lower priority and may be included in later data blobs. Likewise, it is preferred that at least one message from each message thread be included in a data blob as early as possible, such that the message threads may be established on the new device 212 as soon as possible. Message threads having more recent activity therein may be considered a higher priority than message threads which have not been active within a predefined recency.

In one embodiment, the heuristic for packing messages in the data blob may be as follows. Most-recent messaging threads that were active within a predefined recency, for example, within 24 hours of pairing, may have priority. An "active" message thread is one in which the user has sent or received a message within a predefined recency. Within each message thread, the primary device 202 should load a predetermined number of most recent unread messages (e.g. 50 messages). If there are less than the predetermined number of unread messages in the messaging thread, the primary device 202 should load all unread messages plus additional recent messages until reaching the predetermined number of messages. For each messaging thread, no more than the predetermined number of messages should be loaded into the data blob. For example, if a messaging thread has 50 unread messages, but there are 10 system messages in front of the unread messages, primary device 202 will load 50 messages in total for the messaging thread, comprised of 10 system messages and the 40 unread messages. For messaging threads that have not been active within the predefined recency, the primary device 202 should only load the last message in the messaging thread into the data blob. In other embodiments, other heuristics may be used for providing different priorities to individual messages and messaging threads, or, in other embodiments, the priorities may be settable by the user.

The size of the data blob which is constructed may be determined by the primary device. In some instances, the data blob may be of a predetermined, hardcoded size. In other instances, the size of the data blob may be determined dynamically based on, for example, current network conditions. For example, if the primary device 202 detects that network bandwidth is available, data blobs may be of a larger size, while if network bandwidth is unavailable, the data blobs may be set to a smaller size. To construct the data blobs, the primary device 202 may select as many messages, in the order determined as described above, that will fit into a data blob of the given size.

Once the selected user messages are accumulated into the data blob, the data blob may be encrypted using a public key of new device 212 to create encrypted data blob 346. Encrypted data blob 346 may be loaded into message 328. In addition, the primary device 202 may calculate a message authentication code (MAC) 332 and include the MAC 332 in the message 328.

At block 508 primary device 202 will send the message 328, including encrypted data blob 346 to blob store 210, and, will receive, in response, a URL 348 of the stored data blob.

At block 510, primary device 202 constructs E2E encrypted message 334, shown in FIG. 3D. The content of E2E encrypted message 334 may include an encryption key 336 which new device 212 may use to decrypt encrypted data blob 346, HMAC key 338, a hash of the encrypted blob 340, and the pointer 324 (i.e., URL 348) received from blob store 210, indicating the location of the stored encrypted blob 346 in blob store 210. The E2E encrypted message 334 is then sent via intermediate server 204 to new device 212.

At block 512, primary device 202 receives an E2E encrypted reply from new device 212 via the E2E encrypted messaging channel comprising a confirmation that new device 212 was able to successfully download, decrypt and verify encrypted data blob 346. In some embodiments of the invention, if new device 212 is unable to successfully download, decrypt and verify the first data blob sent, the primary device 202 and the new device 212 may become unpaired and the process would need to restart at block 502. Thereafter, should there be errors in the exchange of blobs between primary device 202 and new device 212, the primary device 202 may retry sending the failed data blobs.

At decision block 514, it is determined if there are more messages from the user's messaging history that need to be sent. In some embodiments, the user's full messaging history may be sent to new device 212. In other embodiments, the number of messages sent to new device 212 may vary depending upon the type of new device 212. For example, if the new device is a web browser through which the user accesses the user's messaging history, the most recent 90 days of the user's messaging history or a first pre-determined number of messages may be sent. Likewise, if the device is a desktop computing device, the most recent two years of the user's messaging history or a second pre-determined a number of messages may be sent. It should be realized that the actual number of messages or the time period of the user's messaging history which is sent may vary without departing from the scope of the invention.

At decision block 514, it is determined whether there are more messages which need to be sent. If so, control returns to block 506 where another data blob is constructed, again, filling the data block with as many messages as possible for the given size of the data blob, in the order of the predetermined priority of the messages. If, at decision block 514, is determined that no more messages need to be sent, the process exits at block 516.

Figure 5B:
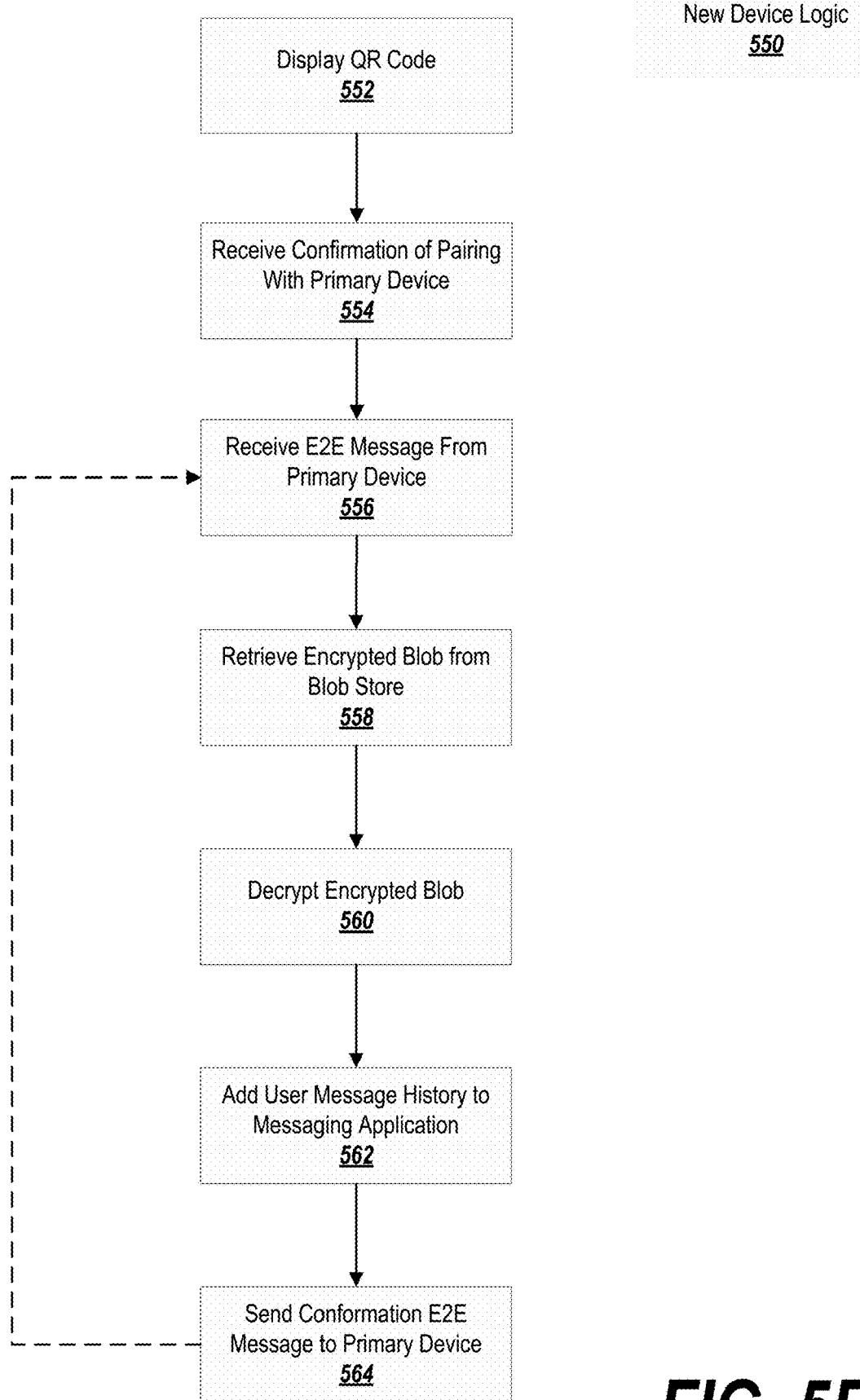
FIG. 5B is a flowchart depicting exemplary new device logic for receiving and processing one or more data blobs containing the user's messaging history.

FIG. 5B is a flowchart depicting exemplary logic 550 performed by a system, such as new device 212, for receiving a user's messaging history from the user's primary device.

At block 552, new device 212 may place itself in a "ready to pair" state by transferring pairing data to the user's primary device 212. In preferred embodiments of the invention, the pairing data is transferred when the new device 212 displays a QR code containing the pairing data on its display. The pairing is initiated when the user of the new device 212 indicates, via a user input, that new device 212 is to be paired with the user's primary device 202 and that, as a result, the user's messaging history is to be transferred from the user's primary device 202 to the new device 212.

At block 554, the new device 212 receives confirmation from intermediate server 204 that the user's primary device 202 has been successfully paired with the new device 212. At this point the new device 212 will wait for the primary device 202 to begin the transfer of the user's messaging history from the primary device 202 to the new device 212.

At block 556, new device 212 receives an E2E encrypted message 334 from primary device 202. New device 212 will decrypt the E2E encrypted message 334 to extract the contents, which include an encryption key 336 which may be used to decrypt encrypted data blob 346 downloaded from blob store 210, an HMAC key 338, a hash of the encrypted data blob 346 and a pointer indicating at a location on blob store 210 from which new device 212 may retrieve encrypted data blob 346. In preferred embodiments of the invention, the pointer will comprise a URL 348 indicating a location on blob store 210 wherein encrypted blob 346 has been stored.

At block 558, new device 212 retrieves the encrypted data blob 346 from blob store 210, using URL 348.

At block 560, new device 212 decrypts the encrypted blob 346 using encryption key 336 received in the E2E encrypted message 334 from primary device 202. The contents may be verified by calculating a hash of the decrypted data blob and comparing it with hash 340 received from primary device 202. Once the data blob has been successfully decrypted and verified, new device 212 will extract messages from the decrypted data blob and add them to the messaging application on new device 212.

At block 564, new device 212 will send a confirmation message via the E2E encrypted messaging channel to primary device 202, indicating the status of the transfer of the data blob. If successful, additional notifications of data blobs may be received, in which case control returns to block 556. If some error occurred during the exchange of the data blob, the primary device 202 may attempt to resend the data blob. In some embodiments of the invention, if the exchange of the first data blob between primary device 202 and new device 212 is unsuccessful, the devices may become unpaired, in which case the process restarts at block 552.

Communications System Overview

Figure 8:
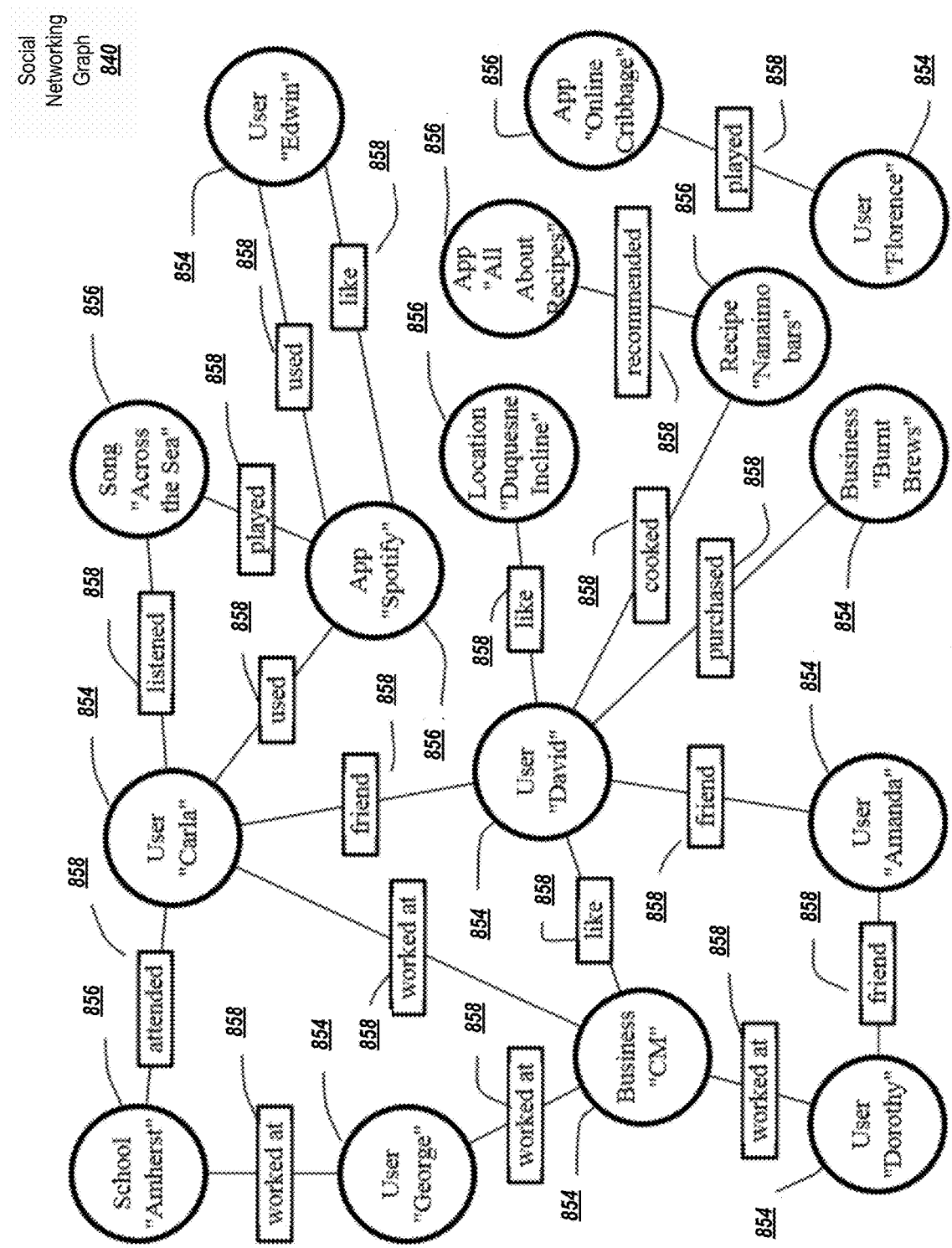
FIG. 8 depicts the social networking graph of FIGS. 6-7 in more detail.

These exemplary embodiments described herein may be implemented by a communications system that is provided locally, at a client device, or remotely (e.g., at a remote server), or some combination thereof. FIGS. 6-8 depict various examples of communications systems and are discussed in more detail below.

FIG. 6 depicts an exemplary centralized communications system 600, which facilitates encrypted communication between two or more clients. The centralized system 600 may implement some or all of the structure and/or operations of a messaging or communications service in a single computing entity, such as entirely within a single centralized server device 626. In such cases, blob store 632 may be integrated with intermediate server 626.

The centralized communications system 600 of dictating may include a computer-implemented system having software applications that include one or more components. Although the communications system 600 shown in FIG. 6 has a limited number of elements in a certain topology, the communications system 600 may include more or fewer elements in alternate topologies.

A communications service 600 may be generally arranged to receive, store, and deliver communications, such as messages. The communications may include or may be associated with media or content items.

A client device 610 may transmit communications addressed to one or more recipient users, user accounts, or other identifiers resolving to receiving client devices 610. In exemplary embodiments, each of the client devices 610 and their respective clients 620 are associated with a particular user or users of the communications service 600. In some embodiments, the client devices 610 may be cellular devices such as smartphones and may be identified to the communications service 600 based on a phone number associated with each of the client devices 610. In some embodiments, each client may be associated with a user account registered with the communications service 600. In general, each client may be addressed through various techniques for the reception of communications. While in some embodiments the client devices 610 may be cellular devices, in other embodiments one or more of the client devices 610 may be personal computers, tablet devices, any other form of computing device and make communicate using cellular data transfer or Wi-Fi.

The client 610 may include one or more input devices 612 and one or more output devices 618. The input devices 612 may include, for example, microphones, keyboards, cameras, electronic pens, touch screens, and other devices for receiving inputs including message data, requests, commands, user interface interactions, selections, and other types of input. The output devices 618 may include a speaker, a display device such as a monitor or touch screen, and other devices for presenting an interface to the communications system 600.

The client 610 may include a memory, which may be a non-transitory computer readable storage medium, such as one or a combination of a hard drive, solid state drive, flash storage, read only memory, or random access memory. The memory may a representation of an input 614 and/or a representation of an output 616, as well as one or more applications. For example, the memory may store a messaging client 620 and/or a social networking client that allows a user to interact with a social networking service.

The input 614 may be textual, such as in the case where the input device 612 is a keyboard. Alternatively, the input 614 may be an audio or video recording, such as in the case where the input device 612 is a microphone or camera.

The input 614 may be subjected to automatic speech recognition (ASR) logic to transform the audio recording to text that is processable by the messaging system 600. The ASR logic may be located at the client device 610 (so that the audio recording is processed locally by the client 610 and corresponding text is transmitted to the intermediate server 626), or may be located remotely at the intermediate server 626 (in which case, the audio recording may be transmitted to the intermediate server 626 and the intermediate server 626 may process the audio into text). Other combinations are also possible—for example, if the input device 612 is a touch pad or electronic pen, the input 614 may be in the form of handwriting, which may be subjected to handwriting or optical character recognition analysis logic to transform the input 612 into processable text.

The client 610 may be provided with a network interface 622 for communicating with a network 624, such as the Internet. The network interface 622 may transmit the input 612 in a format and/or using a protocol compatible with the network 624 and may receive a corresponding output 616 from the network 624.

The network interface 622 may communicate through the network 624 to an intermediate server 626. The intermediate server 626 may be operative to receive, store, and forward messages between messaging clients.

The intermediate server 626 may include a network interface 622, communications preferences 628, and communications logic 630. The communications preferences 628 may include one or more privacy settings for one or more users and/or video communications. For example, the communications preferences 628 may include one or more settings, including default settings, for the logic described herein.

The intermediate server logic 630 may include blob store logic for accepting, storing and distributing encrypted data blobs within blob store 632

The network interface 622 of the client 610 and/or the intermediate server 626 may also be used to communicate through the network 624 with a social networking server 636. The social networking server 636 may include or may interact with a social networking graph 638 that defines connections in a social network. Furthermore, the intermediate server 626 may connect to the social networking server 636 for various purposes, such as retrieving connection information, messaging history, event details, etc. from the social network.

A user of the client 610 may be an individual (human user), an entity (e.g., an enterprise, business, or third-party application), or a group (e.g., of individuals or entities) that interacts or communicates with or over the social networking server 636. The social-networking server 636 may be a network-addressable computing system hosting an online social network. The social networking server 636 may generate, store, receive, and send social-networking data, such as, for example, user-profile data, concept-profile data, social-graph information, or other suitable data related to the online social network. The social networking server 636 may be accessed by the other components of the network environment either directly or via the network 624.

The social networking server 636 may include an authorization server (or other suitable component(s)) that allows users to opt in to or opt out of having their actions logged by social-networking server 636 or shared with other systems (e.g., third-party systems, such as the messaging server 636), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 636 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 636. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 636 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 636 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 636 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 6 may be well-suited to deployment as a new system or as an upgrade to an existing system, because the logic is incorporated into the intermediate server 626. In contrast, FIG. 7 depicts an exemplary distributed messaging system 750, in which functionality for selecting dominant/relevant participants and displaying a reduced-size interface is distributed and remotely accessible from the intermediate server 626. Examples of a distributed system 750 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 7 are identical to those in FIG. 6, and, as such, a description of these elements is not repeated here for the sake of brevity. The primary difference between the centralized embodiment and the distributed embodiment is the addition of a separate blob store 752, which stores the encrypted data blobs and is operated in accordance with blob store logic 732. The blob store 752 may be distinct from the intermediate server 626 but may communicate with the intermediate server 626, either directly or through the network 624, to provide the functionality of the blob store logic 732 to the intermediate server 626.

The embodiment depicted in FIG. 7 may be particularly well suited to allow exemplary embodiments to be deployed alongside existing messaging systems, for example when it is difficult or undesirable to replace an existing messaging server. Additionally, in some cases the intermediate server 626 may have limited resources (e.g. processing or memory resources) that limit or preclude the addition of the additional pivot functionality. In such situations, the capabilities described herein may still be provided through the separate blob store 752.

FIG. 8 illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user and store the user node 854 in one or more data stores. Users and user nodes 854 described herein may, where appropriate, refer to registered users and user nodes 854 associated with registered users. In addition, or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 856 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 856. Profile pages may be viewable by all or a selected subset of other users. As an example, and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example, and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8) between user nodes 854 corresponding to the user and concept nodes 856 corresponding to the song and application to indicate that the user listened to the song and used the application. Moreover, the social-networking system may create a "played" edge 858 (as illustrated in FIG. 8) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8 between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example, and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
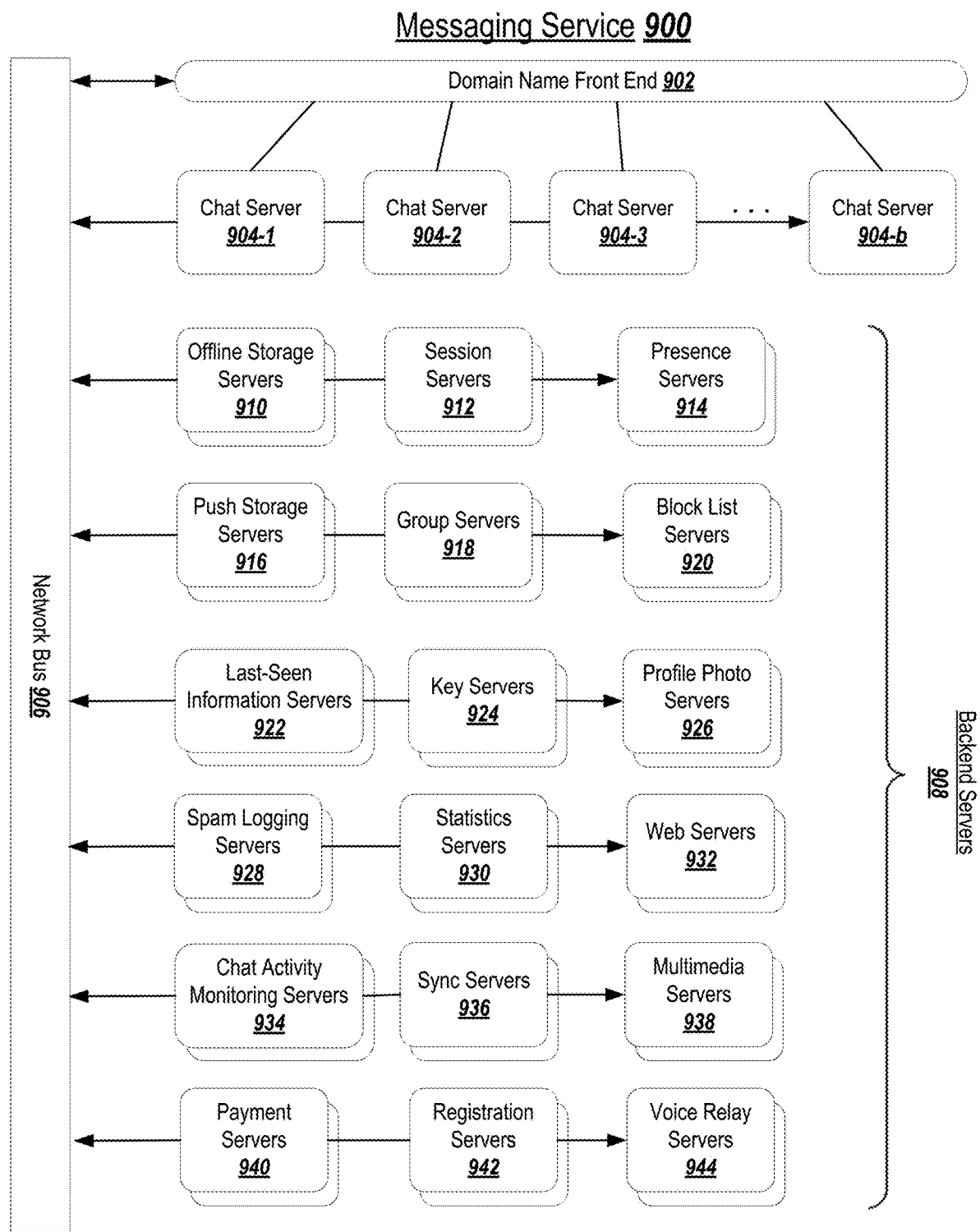
FIG. 9 is a block diagram depicting an example of a system for a messaging service.

FIG. 9 illustrates an embodiment of a plurality of servers implementing various functions of a messaging service 900 suitable for use with exemplary embodiments. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments, tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively, or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
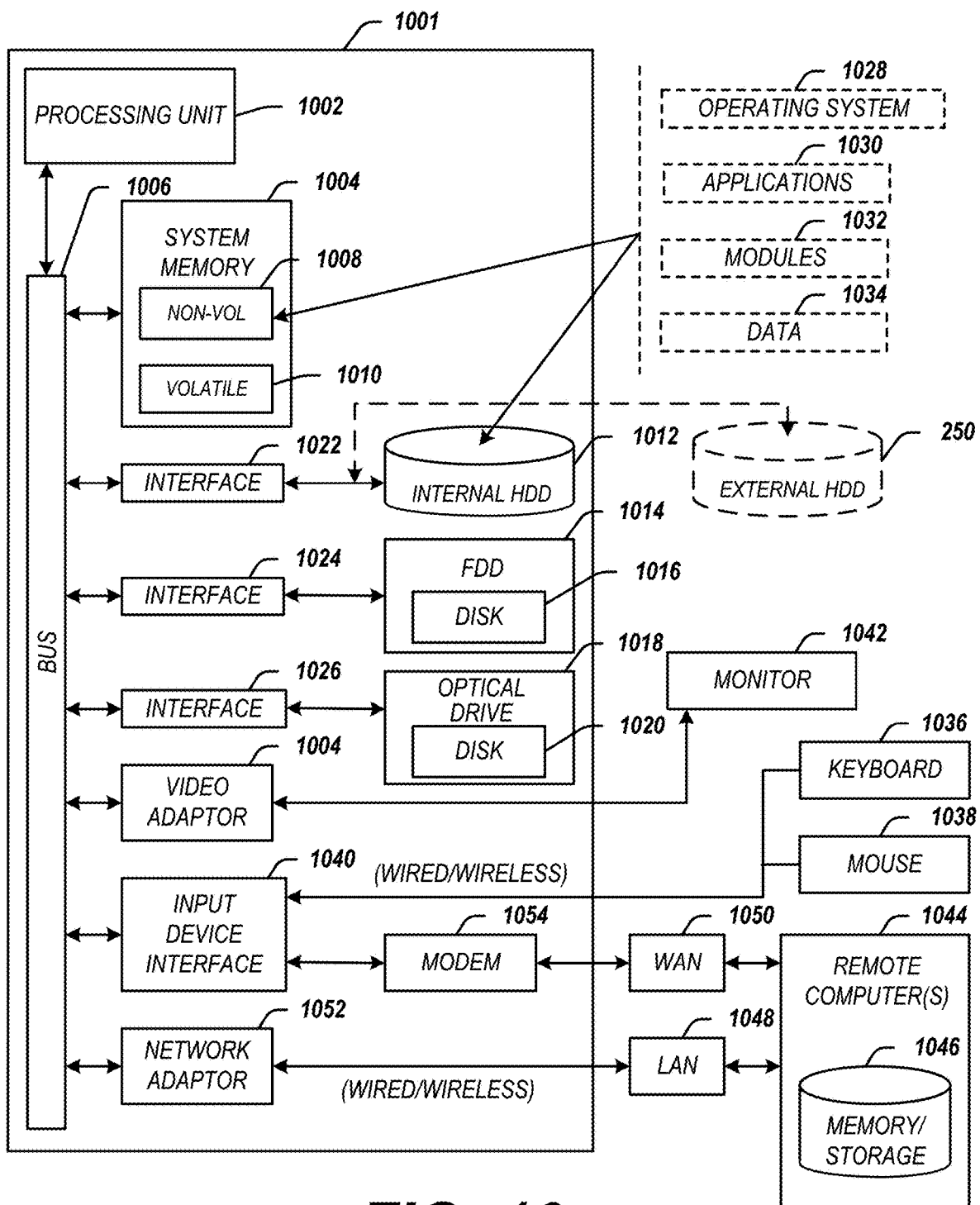
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000, shown in FIG. 10. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
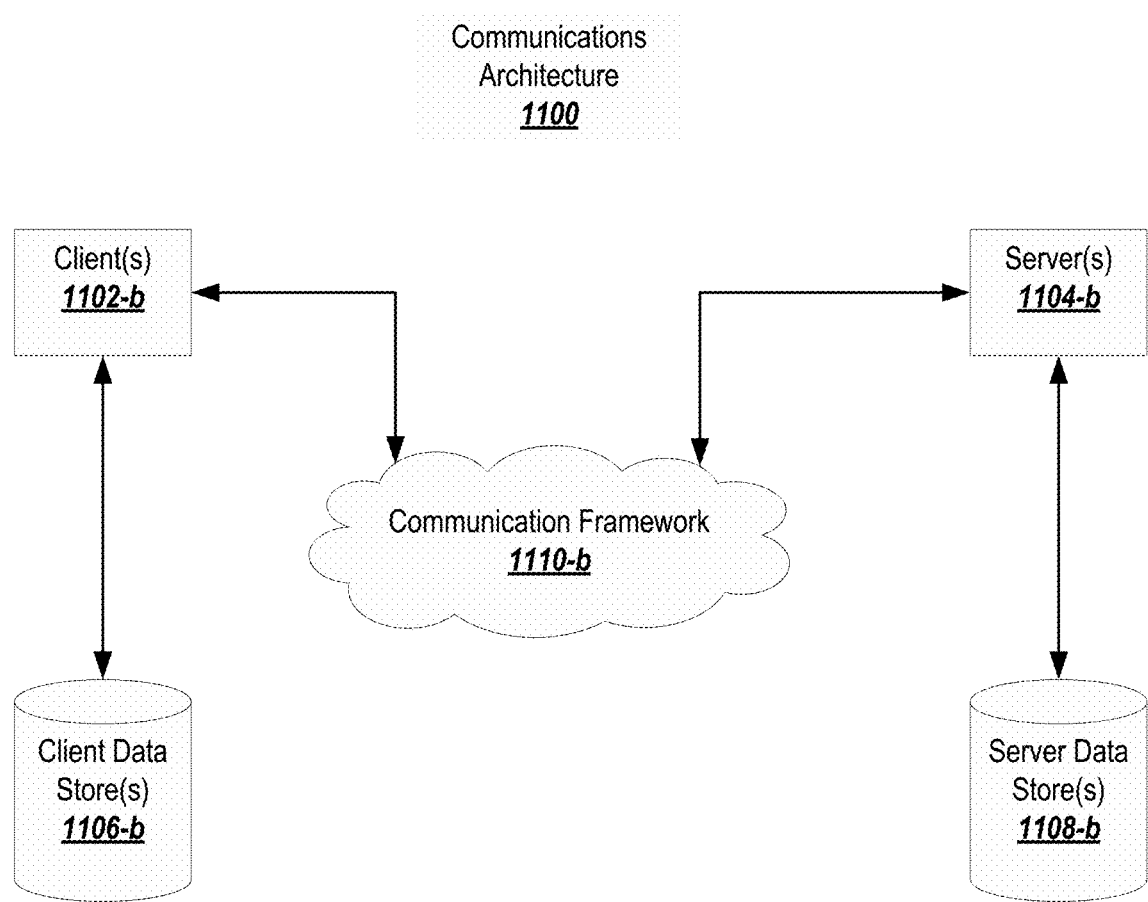
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. Clients 1102 may implement the client device 510. The servers 1104 may implement the server device 526. Clients 1102 and the servers 1104 are operatively connected to one or more respective client data stores 1106 and server data stores 1108 that can be employed to store information local to the respective clients 1102 and servers 1104, such as cookies and/or associated contextual information.

Clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
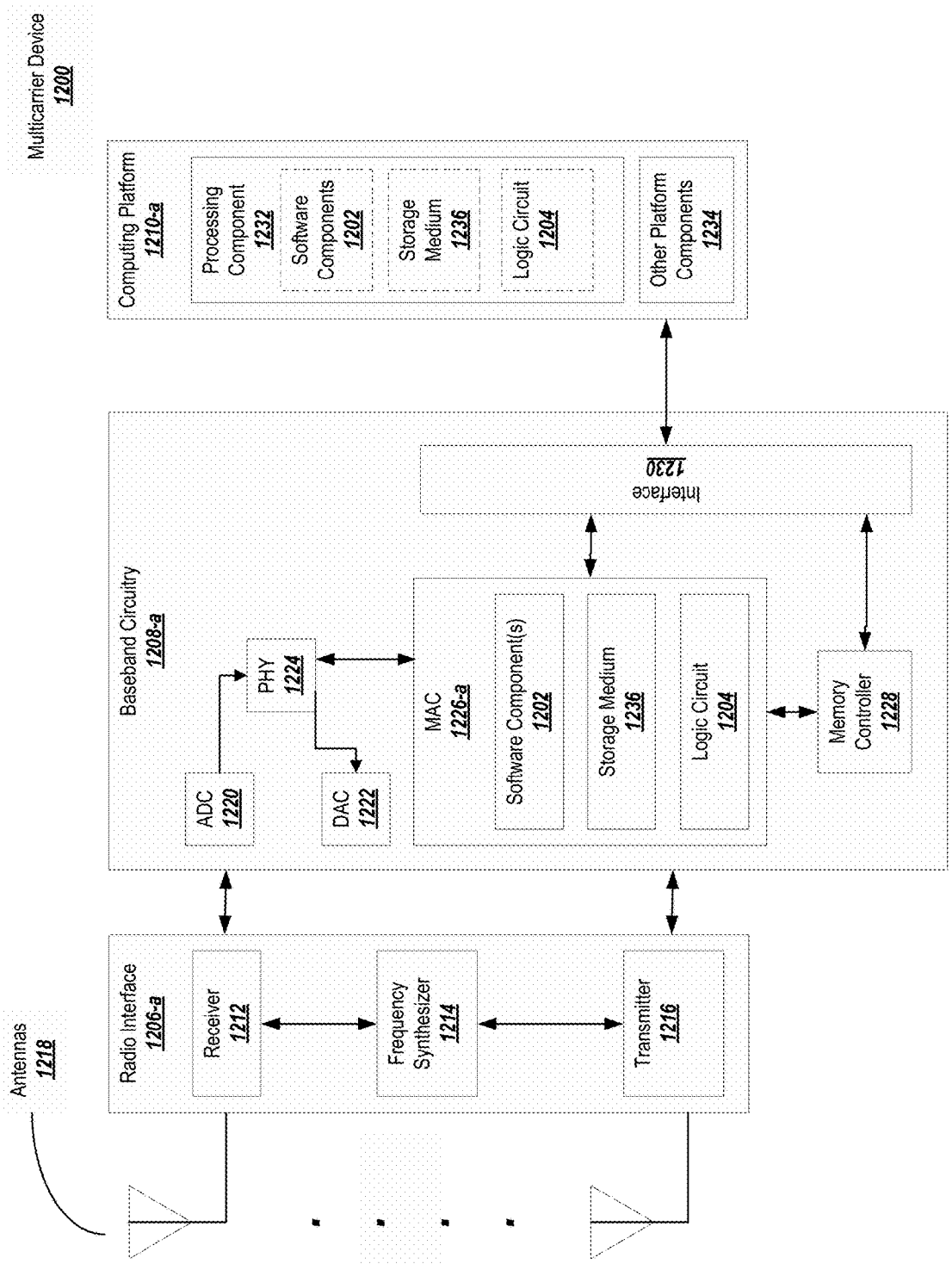
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:

storing all or a subset of messages in a user messaging history in a data blob in accordance with a heuristic that prioritizes storing messages active within a predefined recency period;

encrypting the data blob;

transmitting the data blob to a blob store;

receiving a request to link a recipient device through a primary device, wherein the recipient device is proximate to the primary device;

causing display of a pairing information through the primary device;

receiving the pairing information from the recipient device through a near field connection;

identifying a privacy setting for the user of the primary device, based on a social-graph for a social network of which the user of the primary device is a member;

sending a request to a server to pair with the recipient device, the request including the pairing information and a transfer of the privacy setting for the user of the primary device to the recipient device;

receiving a confirmation of pairing with the recipient device;

sending a message to the recipient device containing information necessary for the recipient device to retrieve and decrypt the data blob; and transferring the messages of the user messaging history to the recipient device.

2. The method of claim 1, further comprising:

receiving a location of the data blob from the blob store, wherein sending a message comprises identifying the location of the data blob and an encryption key for use by the recipient device to decode the data blob.

3. The method of claim 1 further comprising:

receiving a confirmation message from the recipient device indicating that the recipient device has successfully downloaded and decrypted the data blob.

4. The method of claim 1 wherein the steps of method 1 are repeated until all desired messages from the user messaging history have been transferred to the recipient device.

5. The method of claim 1 wherein messages from the user messaging history are stored in data blobs in accordance with a priority determined via user preferences.

6. The method of claim 1 wherein receiving pairing information further comprises:

imaging a QR code displayed on the recipient device; and extracting the pairing information from the image of the QR code.

7. A system comprising
a processor; and
memory, coupled to the processor and containing a software that, when executed by the processor, cause the system to:
store all or a subset of messages in a user messaging history in a data blob in accordance with a heuristic that prioritizes storing messages active within a predefined recency period;
encrypt the data blob;
transmit the data blob to a blob store;
receive a request to link a recipient device through a primary device, wherein the recipient device is proximate to the primary device;
cause display of a pairing information through the primary device;
receive the pairing information from the recipient device through a near field connection;
identify a privacy setting for a user of the primary device, based on a social-graph for a social network of which the user of the primary device is a member;
send a request to a server to pair with the recipient device, the request including the pairing information and a transfer of the privacy setting for the user of the primary device to the recipient device;
receive a confirmation of pairing with the recipient device;
send a message to the recipient device, containing information necessary for the recipient device to retrieve and decrypt the data blob;
transfer the messages of the user messaging history to the recipient device; and
repeat until all desired messages from the user messaging history have been transferred to the recipient device.

8. The system of claim 7, the software further causing the system to:
receive a location of the data blob from the blob store, wherein to send a message comprises identifying the location of the data blob and an encryption key for use by the recipient device to decode the data blob.

9. The system of claim 7, the software further causing the system to:
receive a confirmation message from the recipient device indicating that the recipient device has successfully downloaded and decrypted the data blob.

10. The system of claim 7, the software further causing the system to repeat until all desired messages from the user messaging history have been transferred to the recipient device.

11. The system of claim 7 wherein messages from the user messaging history are stored in data blobs in accordance with a priority determined via user preferences.

12. The system of claim 7 wherein receiving pairing information further comprises:
imaging a QR code displayed on the recipient device; and
extracting the pairing information from the image of the QR code.

13. A non-transitory, computer-readable medium containing instructions that, when executed by a processor, cause the processor to:
store all or a subset of messages in a user messaging history in a data blob in accordance with a heuristic that prioritizes storing messages active within a predefined recency period;
encrypt the data blob;
transmit the data blob to a blob store;
receive a request to link a recipient device through a primary device, wherein the recipient device is proximate to the primary device;
cause display of a pairing information through the primary device;
receiving the pairing information from the recipient device through a near field connection;
identify a privacy setting for a user of the primary device, based on a social-graph for a social network of which the user of the primary device is a member;
send a request to a server to pair with the recipient device, the request including the pairing information and a transfer of the privacy setting for the user of the primary device to the recipient device;
receive a confirmation of pairing with the recipient device;
send a message to the recipient device, containing information necessary for the recipient device to retrieve and decrypt the data blob;
transfer the messages of the user messaging history to the recipient device; and
repeat at least one prior step until all desired messages from the user messaging history have been transferred to the recipient device.

14. The computer-readable medium containing instructions of claim 13, further comprising instructions to cause the processor to:
receive a location of the data blob from the blob store, wherein to send a message comprises identifying the location of the data blob and an encryption key for use by the recipient device to decode the data blob.

15. The computer-readable medium containing instructions of claim 13, further comprising instructions to cause the processor to:
receive a confirmation message from the recipient device indicating that the recipient device has successfully downloaded and decrypted the data blob.

16. The computer-readable medium containing instructions of claim 13 wherein messages from the user messaging history are stored in data blobs in accordance with a priority determined via user preferences.

17. The computer-readable medium containing instructions of claim 13 wherein receiving pairing information further comprises:
imaging a QR code displayed on the recipient device; and
extracting the pairing information from the image of the QR code.

* * * * *